United States Patent
Wilson

(10) Patent No.: US 6,313,788 B1
(45) Date of Patent: Nov. 6, 2001

(54) METHOD AND APPARATUS FOR RELIABLE INTER-ANTENNA BASELINE DETERMINATION

(75) Inventor: John M. Wilson, Sunnyvale, CA (US)

(73) Assignee: Seagull Technology, Inc., Los Gatos, CA (US)

(*) Notice: Subject to any disclaimer, the term of this patent is extended or adjusted under 35 U.S.C. 154(b) by 0 days.

(21) Appl. No.: 09/134,228

(22) Filed: Aug. 14, 1998

(51) Int. Cl.[7] .............................. G01S 5/02; H04B 7/185
(52) U.S. Cl. ........................................................ 342/357.11
(58) Field of Search ........................................ 342/357.11

(56) References Cited

U.S. PATENT DOCUMENTS

| | | | |
|---|---|---|---|
| 4,384,293 | 5/1983 | Deem et al. | 343/113 |
| 4,754,280 | 6/1988 | Brown et al. | 342/357 |
| 4,812,991 | 3/1989 | Hatch | 364/458 |
| 4,963,889 | 10/1990 | Hatch | 342/357 |
| 5,021,792 | 6/1991 | Hwang | 342/357 |
| 5,072,227 | 12/1991 | Hatch | 342/357 |
| 5,101,356 | 3/1992 | Timothy et al. | 364/449 |
| 5,185,610 | 2/1993 | Ward et al. | 342/357 |
| 5,296,861 | 3/1994 | Knight | 342/357 |
| 5,347,286 | 9/1994 | Babitch | 342/359 |
| 5,446,465 | 8/1995 | Diefes et al. | 342/357 |
| 5,506,588 | 4/1996 | Diefes et al. | 342/357 |
| 5,534,875 | 7/1996 | Diefes et al. | 342/357 |
| 5,543,804 | 8/1996 | Buchler et al. | 342/357 |
| 5,546,309 | 8/1996 | Johnson et al. | 364/434 |
| 5,548,293 | 8/1996 | Cohen | 342/357 |
| 5,561,432 | 10/1996 | Knight | 342/357 |
| 5,617,317 | 4/1997 | Ignagni | 364/449.9 |

OTHER PUBLICATIONS

Cohen, Clark E., "Attitude Determination Using GBS" Ph.D. Thesis, Stanford University (1992).

Hayward et al. "Inertially Aided GPS Based Attitude Heading Reference System (AHRS) for General Aviation Aircraft" Proceedings of ION–GPS 97 (Sep. 1997) All pages.

Primary Examiner—Thomas H. Tarcza
Assistant Examiner—Fred H Mull
(74) Attorney, Agent, or Firm—McCutchen, Doyle, Brown & Enersen, LLP

(57) ABSTRACT

Disclosed is a method for inter-antenna baseline determination that uses an antenna configuration comprising a pair of relatively closely spaced antennas and other pairs of distant antennas. The closely spaced pair provides a short baseline having an integer ambiguity that may be searched exhaustively to identify the correct set of integers. This baseline is then used as a priori information to aid the determination of longer baselines that, once determined, may be used for accurate run time attitude determination.

37 Claims, 13 Drawing Sheets

METHOD AND APPARATUS FOR RELIABLE INTER-ANTENNA BASELINE DETERMINATION

FEDERAL GOVERNMENT LICENSE RIGHTS

The U.S. Government has a paid-up license in this invention and the right in limited circumstances to require the patent owner to license others on reasonable terms as provided for by the terms of NAS 1-20644 awarded by NASA.

BACKGROUND OF THE INVENTION

1. Field of the Invention

This invention relates generally to automated methods of attitude determination and particularly to methods employing antenna arrays detecting radio waves.

2. Background

Pairs of antennas capable of sensing radio source carrier wave phases may be used to measure the attitude of an object. If the locations of the radio sources are known along with the number of cycles between antenna pairs, then detection of multiple radio sources reveals the attitude of an antenna array through ordinary geometry. An example of a device capable of producing radio source carrier waves is a satellite.

Because the number and location of GPS satellites is known, they are well-adapted for use in making attitude determinations in the out-of-doors. However one is ordinarily only able to sense the instantaneous phase angle of the radio source carrier wave. Thus for an antenna pair, with each antenna reporting a detected phase, there is an ambiguous number of cycles between the antennas. The ambiguity must be resolved in order for attitude to be determined from the radio sources.

The geometry of the antenna configuration limits the scope of the ambiguity in practice. However, the desire for long antenna baselines to achieve accurate attitude measurements results in the integer ambiguity associated with such baselines being computationally impractical to resolve through the evaluation of every candidate integer set. Unremovable noise in carrier phase measurements further complicates integer ambiguity resolution.

Establishing an acceptable integer ambiguity resolution system is vital to the usability of any GPS attitude instrument, however. Correct integer ambiguity resolution is most vital at the initial startup of the instrument, because before any attitude solutions can be calculated, the integers must be determined for at least a minimum set of satellites and antenna pairs.

There are two ways in which integer ambiguity resolution can fail. The first is that no set of integers which meets the criteria for acceptance is found. This type of failure is not disastrous since it is possible to try again with another epoch of data.

The second type of failure is wholly unacceptable, and that is when a set of integers is selected which meets the acceptance criteria, but which is in fact an incorrect set. Such false integer sets would lead to attitude determinations that would be in error, and if undetected, could result in the reporting of hazardously misleading information to the user.

Thus it is critical that above all else, no false set of integers ever be allowed to be used in calculating GPS attitude that is subsequently passed on to the user of the instrument.

In order to facilitate the discussion of integer search reliability, it is useful to define several measures of the quality of the results obtained. The first measure is the pass rate, or the percentage of measurement sets for which an integer set is determined that passes all quality checks and is subsequently used to produce an attitude solution. The second measure is the true initialization rate, defined as the percentage of solutions that both pass and are correct. The final measure is the false initialization rate, defined as the percentage of passing solutions that are incorrect.

It is relatively straightforward, as mentioned previously, to use a combination of quality checks to achieve a high pass rate and high true initialization rate. The very difficult matter is constructing a technique that preserves high pass rates and true initialization rates while suppressing false initializations entirely, or reducing the false initialization rate to zero.

A related approach to integer ambiguity resolution can be presented as an example. There, for a particular antenna array consisting of three antennas and therefore three baselines, a double-difference integer ambiguity resolution scheme was employed that utilized appropriate limits on baseline magnitudes and inter-baseline angles. The candidate integer sets were rank ordered according to the magnitude of the residual vector from the least-squares solution. Extensive efforts were made to select the best possible parametric values for the baseline magnitude and angle limits. As would be expected, the tighter the limits imposed, the lower the pass rates become. However, false initialization rates, while reduced to less than 1%, were never entirely eliminated by this approach.

The answer as to why such an approach cannot completely eliminate false solutions is that in some particular situations of satellite - baseline geometry, so long as there is noise present in the carrier phase measurements, an incorrect set of integers will appear by all measures to represent a superior solution to the correct set of integers. This unfortunate circumstance is generally true whenever there is any integer ambiguity; a false initialization rate of zero cannot be guaranteed through the use of rank ordering and enforcement of solution quality criteria alone.

There are at least two general classes of approaches to addressing this dilemma.

The first approach involves the use of multiple epochs of data to determine the correct integer set. While it might be impossible to identify a false set of integers as false and select the true integer set given a single epoch of data, it will eventually become clear that the true set is superior to the false set as more epochs of data are gathered, particularly as the satellite geometries and/or baseline orientations change.

A second method that can be used to aid the resolution of ambiguity is a priori knowledge of attitude. In fact, if the initial attitude is known precisely, then the integers can be directly calculated for each baseline and no integer ambiguity exists. This method can be useful if there are auxiliary sensors that can be used to initialize the GPS attitude, or after reacquisition of GPS signals following an outage during which attitude has been updated using inertial sensors. However, since a priori knowledge of attitude will never be exact and since there will always be noise in carrier phase measurements, this approach by itself cannot be guaranteed to work flawlessly.

Therefore a method and apparatus for reliable inter-antenna baseline determination is needed.

SUMMARY OF THE INVENTION

In light of this need, one aspect of the invention provides a method for determining inter-antenna baselines from radio wave phase measurements. This method identifies a first, second and third antenna; determines a first baseline between the first and second antenna using what is termed a "backward" integer search procedure; and determines a second baseline between the second and third antennas using what is termed a "forward" integer search procedure responsive to the first baseline.

Another aspect of the invention provides a method for selecting a baseline from a plurality of baseline candidates. This method ranks the baseline candidates and identifies a highest and next highest ranked baseline candidate. A difference between the highest and next highest ranked candidate is then computed. If the difference is large enough (indicating a uniquely best baseline candidate) the highest ranked is selected as baseline.

Yet another aspect of the invention provides a method for determining an inter-antenna baseline from estimates of two or more orientation angles of the baseline. This method determines a limited geometric region from the estimates of the two or more orientation angles, identifies a plurality of baselines candidate vectors in the geometric region corresponding to integer sets that resolve an integer ambiguity associated with the baseline, and selects the baseline from among the vectors in the limited geometric region.

Yet another aspect of the invention is an antenna configuration comprising a first, second, and third antenna. The first and second antenna are separated by a distance less than or equal to 1.75 wavelengths of a predetermined wave. The second and third antenna are separated by a distance greater than or equal to 3.0 wavelengths of the predetermined wave.

DETAILED DESCRIPTION OF THE INVENTION

Figure 1:
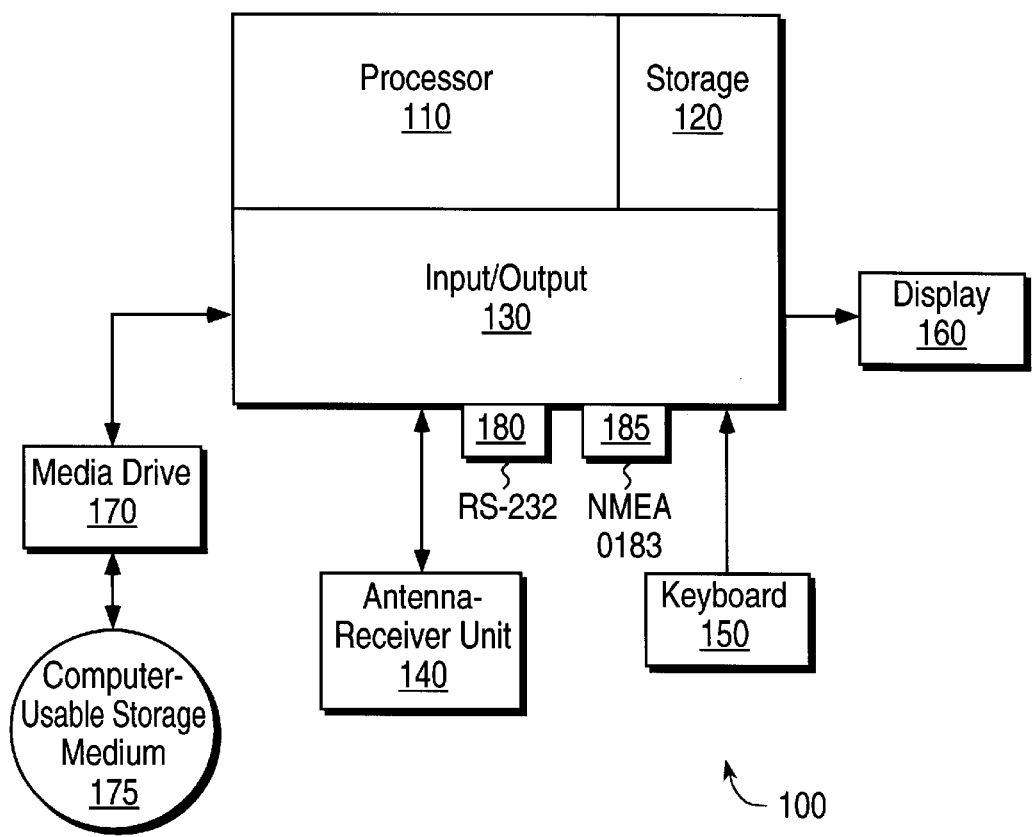
FIG. 1 depicts a 'microprocessor based system' in accordance with an illustrative embodiment.

Notations and Nomenclature $b_{ij}$ Baseline vector representing position of antenna i relative to antenna j c Speed of propagation of carrier wave $DD_{ij_S}$ (n−1)×1 matrix of sensed carrier phase double differences for antenna pair ij $LOS^K$ line-of-sight unit vector pointing toward radio source K LOS n×3 matrix of line-of-sight unit vectors toward n radio sources dLOS (n−1)×3 matrix of differences between radio source line-of-sight unit vectors $N_{ij}^k$ Integer for antenna pair ij and radio source K $N_{ij}$ n×1 matrix of single-difference integers for antenna pair ij $N_{ij_D}$ (n−1)×1 matrix of double-difference integers for antenna pair ij L Known distance between antennas i and j P Pseudoinverse matrix $[LOS^T LOS]^{-1} LOS^T$ $P_D$ Pseudoinverse matrix $[dLOS^T dLOS]^{-1} dLOS^T$ $SD_{ij}$ n×1 matrix of carrier phase single differences for antenna pair ij $SD_{ij_S}$ n×1 matrix of sensed carrier phase single differences for antenna pair ij $\Delta t_{Cij}$ Actual time of measurement at receiver j minus that at receiver i ("receiver clock bias").

$\Delta t_{Lij}$ Receiver-antenna propagation delay for receiver-antenna unit i minus that for receiver-antenna unit j ("receiver line bias")

λ Carrier wavelength $v_{ij}^K$ Measurement noise for antenna-receiver pair ij and radio source K $v_{ij}$ n×1 matrix of measurement noise for antenna-receiver pair ij $v_{ij_D}$ (n−1)×1 matrix of double-difference measurement noise $\phi_i^K$ Carrier phase measured at antenna i for radio source K $\phi_j^K$ Carrier phase measured at antenna j for radio source K $(\phi_i^K - \phi_j^K)_S$ Sensed phase difference for antenna-receiver pair ij and radio source K $(\phi_i^K - \phi_j^K)_M$ Measured phase difference for antenna-receiver pair ij and radio source K $\dot{r}^K$ Rate of change of range from observer to radio source K Equations $$\phi_i^K - \phi_j^K = (LOS^K \cdot b_{ij})/\lambda \tag{1}$$

$$SD_{ij} = [LOS] b_{ij}/\lambda \tag{2}$$

$$b_{ij} = \lambda [LOS^{-1}] SD_{ij} \tag{3}$$

$$b_{ij} = \lambda P SD_{ij} \tag{4}$$

$$P = [LOS^T LOS]^{-1} LOS^T \tag{5}$$

$$e_{ij} = SD_{ij} - [LOS][P] SD_{ij} \tag{6}$$

$$(\phi_i^K - \phi_j^K)_S = (\phi_i^K - \phi_j^K)_M + \frac{f^K}{\lambda}\Delta t_{Cij} \tag{7}$$

$$(\phi_i^K - \phi_j^K) = \left[(\phi_i^K - \phi_j^K)_S + \frac{c}{\lambda}(\Delta t_{Cij} + \Delta t_{Lij})\right] + N_{ij}^K - v_{ij}^K \tag{8}$$

$$SD_{ij} = SD_{ijS} + \frac{c}{\lambda}(\Delta t_{Cij} + \Delta t_{Lij}) + N_{ij} - v_{ij} \tag{9}$$

$$DD_{ij} = DD_{ijS} + N_{ijD} - v_{ijD} \tag{10}$$

$$|\phi_i^K - \phi_j^K| \le L/\lambda \tag{11}$$

$$(\phi_i^K - \phi_j^K) = frac\left[(\phi_i^K - \phi_j^K)_S + \frac{c}{\lambda}(\Delta t_{Cij} + \Delta t_{Lij}) + N_{ij}^K - v_{ij}^K\right] \tag{12}$$

$$|\phi_i^K - \phi_j^K| = \left|frac\left[(\phi_i^K - \phi_j^K)_S + \frac{c}{\lambda}(\Delta t_{Cij} + \Delta t_{Lij})\right] + N_{ij}^K\right| \le L/\lambda \tag{13}$$

$$-0.5 \le \left|frac\left[(\phi_i^K - \phi_j^K)_S + \frac{c}{\lambda}(\Delta t_{Cij} + \Delta t_{Lij})\right]\right| \le 0.5 \tag{14}$$

$$|N_{ij}^K| \le L/\lambda + 0.5 \tag{15}$$

$$|N_{ij}^K| \le L/\lambda + 0.5 + |v_{ij}^K|_{max} \tag{16}$$

$$(\phi_i^K - \phi_j^K) - (\phi_i^M - \phi_j^M) = \tag{17}$$
$$frac\left[(\phi_i^K - \phi_j^K)_S - (\phi_i^M - \phi_j^M)_S\right] + N_{ij}^K - N_{ij}^M - v_{ij}^K + v_{ij}^M$$

$$DD_{ij}^{KM} = frac[DD_{ijS}^{KM}] + N_{ij}^{KM} - v_{ij}^{KM} \tag{18}$$

$$DD_{ij}^{KM} \equiv (\phi_i^K - \phi_j^K) - (\phi_i^M - \phi_j^M) \tag{19}$$
$$DD_{ijS}^{KM} \equiv (\phi_i^K - \phi_j^K)_S - (\phi_i^M - \phi_j^M)_S$$
$$N_{ij}^{KM} \equiv N_{ij}^K - N_{ij}^M$$
$$v_{ij}^{KM} \equiv v_{ij}^K - v_{ij}^M$$

$$|N_{ij}^{KM}| \le 2L/\lambda + 0.5 \tag{20}$$

$$|N_{ij}^K| \le 0.8 + 0.5 \tag{21}$$

$$|N_{ij}^{KM}| \le 1.6 + 0.5 \tag{22}$$

Description of Figures

FIG. 1 depicts a microprocessor based system 100 capable of embodying aspects of the invention. Shown are a microprocessor 110, a storage 120 and an input/output system 130. The input/output system 130 is capable of receiving information from a set of antenna-receiver units 140 such as the 'antenna-receiver' unit 330 discussed below in connection with FIG. 3B. Further illustrated is a media drive 170, such as a disk drive, CD-ROM drive, or the like. The media drive 170 may operate with a computer-usable storage medium 175 capable of embodying computer-readable code able to configure the microprocessor-based system to embody aspects of the invention. The input/output system 130 may also operate with a keyboard 150 or a display 160. The input/output system 130 may also communicate through well-known data transmission ports such as a RS-232 connector 180 or a NMEA 0183 connector 185.

As one skilled in the art would recognize, there are numerous structures of programmed or programmable logic capable of being configured to embody aspects of the invention. These may include, without limitation, a general purpose computer having either one or plural processors, a special purpose computer, an application specific integrated circuit (ASIC), a complex programmable logic device (CPLD), a field programmable gate array (FPGA), or other device known in the computing arts to be able to perform the necessary processing.

Figure 2:
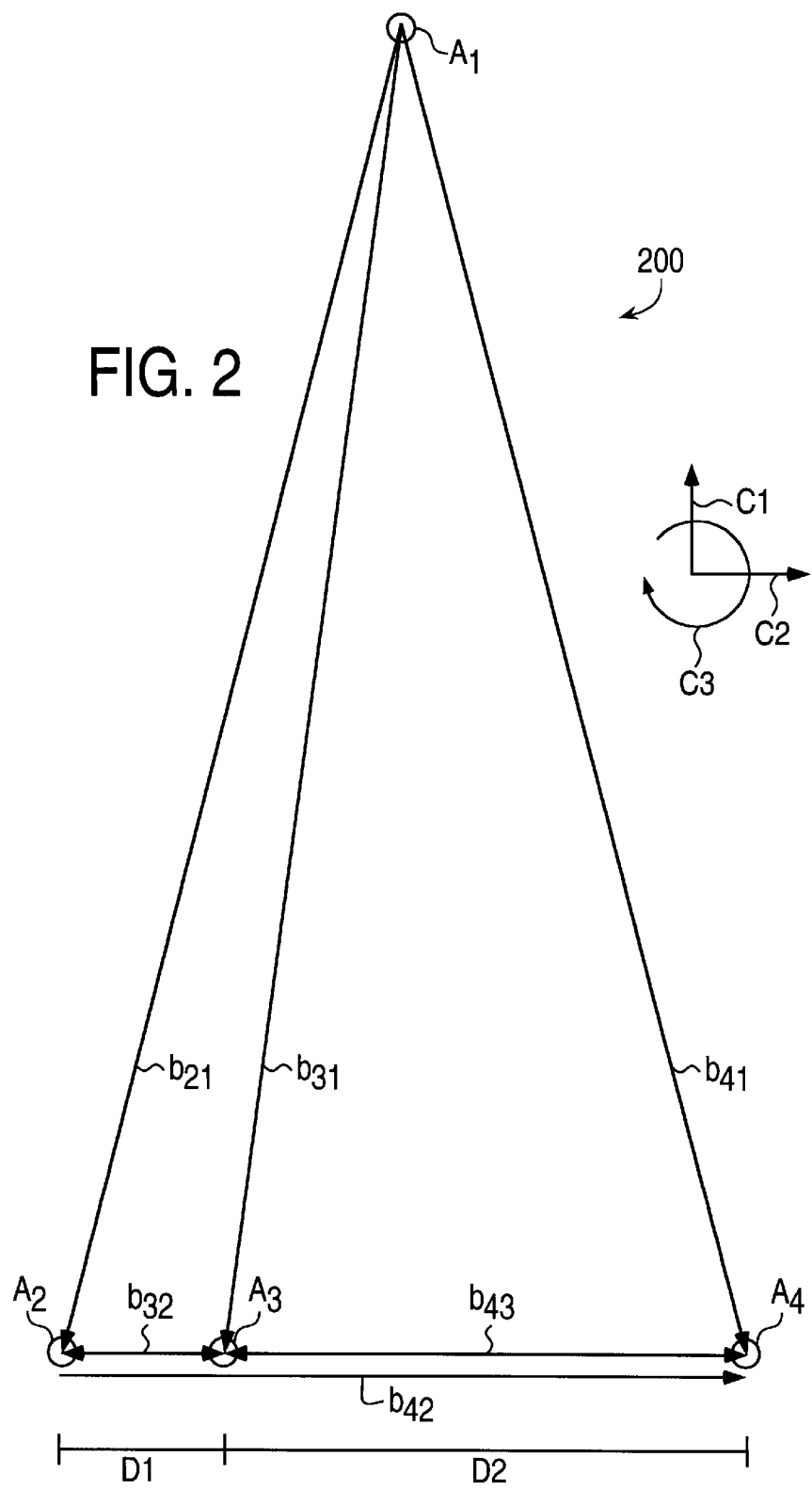
FIG. 2 depicts an 'antenna configuration' in accordance with an illustrative embodiment.

FIG. 2 illustrates an antenna configuration 200 in accordance with one embodiment of the invention. Depicted comprising the antenna configuration 200 are a first antenna A1, a second antenna A2, a third antenna A3, and a fourth antenna A4. Also shown are a first baseline $b_{32}$, a second baseline $b_{43}$, a third baseline $b_{21}$, and a set of remaining baselines $\{b_{41}, b_{31}, b_{42}\}$. In one embodiment the antennas are coplanar although one skilled in the art will quickly realize that this is not fundamental to the present invention which also encompasses non-coplanar antenna configurations without limitation. Table 1 lists the dimensions of the antenna configuration in one embodiment of the invention.

TABLE 1

| Dimension | Value (cm) | Value (GPS L1 wavelengths) |
|---|---|---|
| $|b_{32}|$ | 16.0 | 0.84 |
| $|b_{42}|$ | 60.0 | 3.15 |
| $|b_{21}| = |b_{41}|$ | 134.4 | 7.06 |

In reference to FIG. 2 and Table 1, in one embodiment the dimension $|b_{32}|$ corresponds to the distance the second antenna A2 and the third antenna A3 are located apart D1. Similarly, the dimension $|b_{42}|$ corresponds to the distance the third antenna A3 and the fourth antenna A4 are located apart D2.

One skilled in the art will realize that the present invention is not limited to applications using the GPS L1 carrier frequency. Rather, in other embodiments of the invention, it would be possible to use, for example, the L1 (1575.42 MHz) and L2 (1227.60 MHz) carrier frequencies either alone or in concert. One embodiment of the present invention would use each of a plurality of GPS carrier frequencies, e.g. L1 and L2. Such an embodiment would determine baseline candidates on the basis of the plurality of frequencies. Candidates that are favorably evaluated using various figures of merit, such as the magnitude of the residual of a least squares solution, for measurements taken at plural frequencies may be regarded as more reliable candidates for the actual baseline sought. Implementations of such a method would be able to provide greater robustness and accuracy in the determination of inter-antenna baselines and are within the scope of the present invention.

An overview of an illustrative embodiment can be provided by reference to FIG. 2. The illustrative embodiment uses what are termed herein a "backward" integer search procedure and a "forward" integer search procedure. The backward approach consists of a nested search through all the possible values of each integer, and results in each possible integer set being tested for its quality. It is a search carried out through the full range of integer space. By contrast, the forward approach consists of using a priori knowledge of the possible locations of the two antennas with respect to one another to calculate a subset of integer combinations for consideration. It is a search carried out through geometric space rather than integer space.

The backward approach is appealing when there is no a priori knowledge of the relative locations of the antennas, or when the separation of the antennas is small enough to limit the number of possible integer combinations. The forward approach is generally superior when there is a good a priori estimate of the antennas' positions with respect to one another. Both methods have potential pitfalls that must be guarded against in practice.

A combination of these two approaches provides practical, robust integer ambiguity resolution in combination with particular antenna arrays.

In the illustrative embodiment, the first baseline $b_{32}$ is determined using a backward integer search procedure. The fact that the first baseline $b_{32}$ is chosen to be relatively short makes this exhaustive search of the feasible candidate integer sets computationally practicable. If no candidate integer set results in a baseline passing quality tests, or if two comparable best candidate integer sets are found, another epoch of data is used until the first baseline $b_{32}$ is determined. While the illustrative embodiment may, on occasion, use multiple epochs of data, one skilled in the art will recognize that it can successfully determine all needed baselines based on a single epoch of data.

When the first baseline $b_{32}$ is determined estimates of the heading and roll of the antenna configuration are made based on the first baseline $b_{32}$. Using this information in conjunction with knowledge of the magnitude and relative orientation of the second baseline $b_{43}$, a forward integer search procedure is used determine the second baseline $b_{43}$. A similar search is then conducted to determine the third baseline $b_{21}$. After the first, second, and third baselines are determined, the integers for the set of remaining baselines $\{b_{41}, b_{31}, b_{42}\}$ may be conveniently determined from simple mathematical sums, since the sum of integers around any geometrically closed circuit is zero. Once computed, least-squares solutions for the set of remaining baselines $\{b_{41}, b_{31}, b_{42}\}$ are calculated.

Figure 3A:
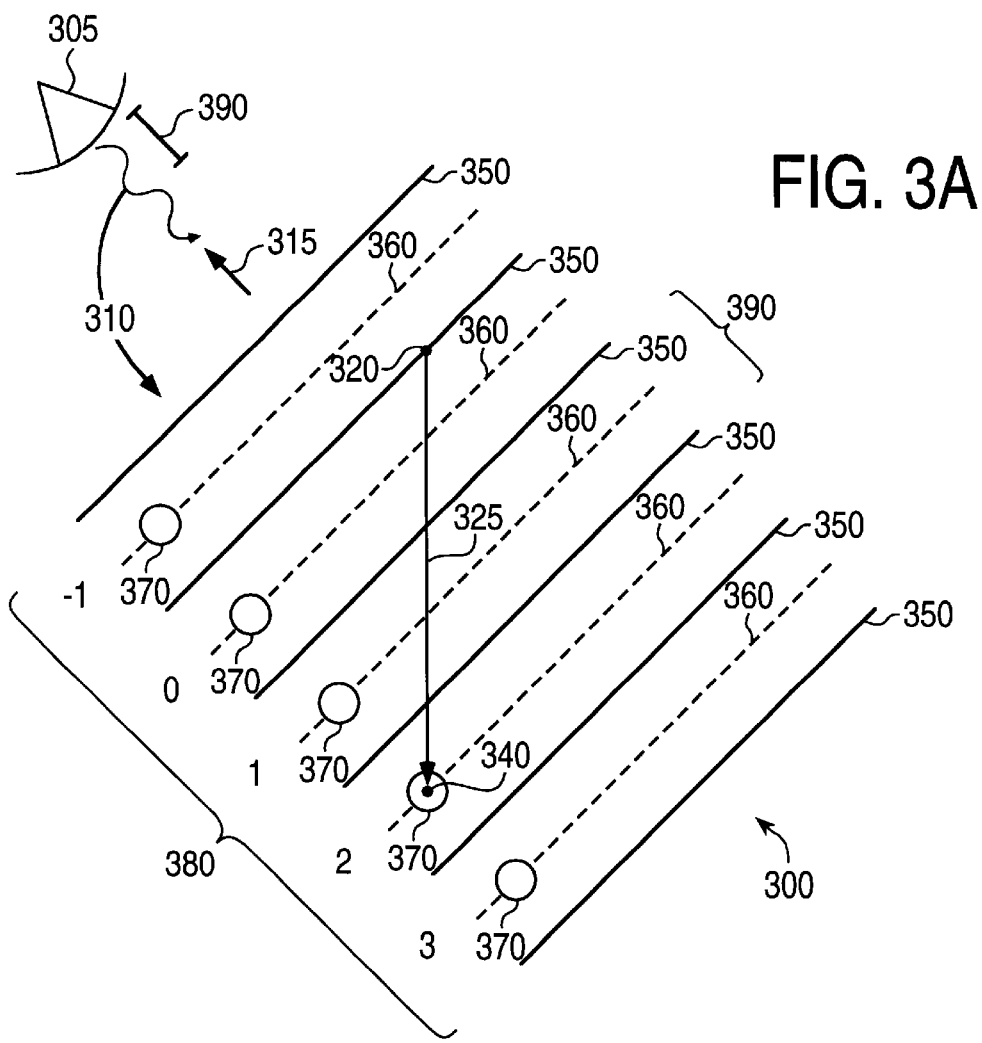
FIG. 3A depicts an 'integer ambiguity associated with an inter-antenna baseline' in accordance with an illustrative embodiment.

FIG. 3A illustrates an 'integer ambiguity associated with an inter-antenna baseline' 300. A radio wave source 305 is shown from which a radio source carrier wave 310 propagates down and to the right of the figure. Typically there is more than one radio wave source 305. In an illustrative embodiment of -the invention, the radio wave sources are Global Positioning System (GPS) satellites and the radio source carrier wave 310 is a GPS carrier wave. One skilled in the art would recognize that the designation radio wave source 305 and radio source carrier wave 310 do not limit the scope of the present invention to those portions of the electromagnetic spectrum associated with radio broadcasts and, rather, the present invention is applicable to other portions of the electromagnetic spectrum without limitation. One skilled in the art would further recognize that the present invention is not limited to use with orbiting radio sources. Rather the present invention may also be used with so called "pseudolites," for example radio sources installed indoors, fixed outdoor sources, or mobile outdoor sources that are not in orbit.

An 'antenna i' 320 and an 'antenna j' 340 are generically depicted as is a 'line of site' unit vector 315 ("LOS") pointing toward the radio wave source 305. 'Antenna i' 320 and 'antenna j' 340 are arbitrarily chosen but may be, for example, antennas depicted in the antenna configuration 200 of FIG. 2. They form an antenna pair ij. Depicted between 'antenna i' 320 and 'antenna j' 340 is a baseline 325. The baseline 325 may be, for example, a baseline depicted in the antenna configuration 200 of FIG. 2. The baseline 325 represents a vector parallel to, and of equal magnitude, as a line segment connecting 'antenna i' 320 and 'antenna j' 340. At the moment in time depicted in FIG. 3A, 'antenna i' 320 is on a locus of phase 0.0 wavelength 350 and 'antenna j' 340 is on an a locus of phase 0.5 wavelength 360.

Figure 3B:
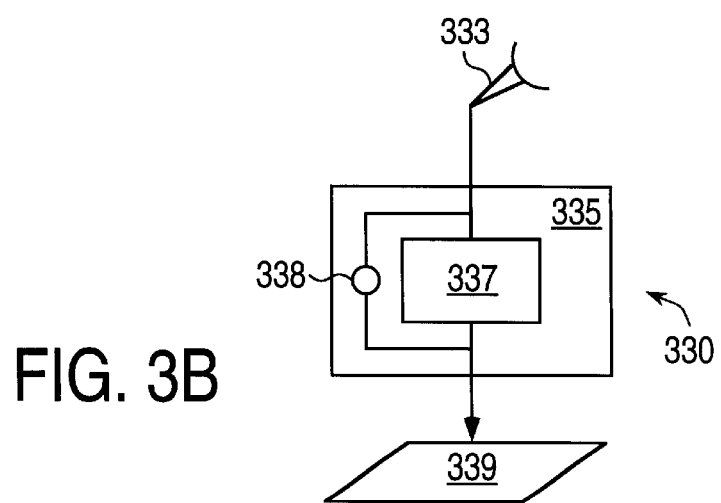
FIG. 3B depicts an antenna-receiver unit in accordance with an illustrative embodiment.

Depicted in further detail in FIG. 3B is an 'antenna-receiver' unit 330 comprising an antenna 333, such as 'antenna i' 320 or 'antenna j' 340. The antenna 333 is connected to a receiver 335 comprising a phase reporter 337, such as a phase locked loop. The receiver 335 reports a phase 339. The 'antenna-receiver' unit 330 may contain a clock 338. The clock 338 may be common to multiple receiver-antenna units or multiple receiver-antenna units may each have their own non-common clock. While the present description is of a configuration in which for each antenna there is a receiver, one skilled in the art will recognize that others may be employed. For example, one embodiment would employ a receiver for antenna pairs, and this receiver would report phase differences between the antenna pair. Another embodiment would use a receiver to report the phase detected at multiple antennas, e.g. multiplexing. When multiplexing would be used in this manner, a single receiver could be employed to report the phases that are present at each antenna in the antenna configuration.

In the illustrative embodiment, the receivers attached to 'antenna i' 320 and 'antenna j' 340 will report the fractional carrier phases of 0.0 and 0.5 wavelengths, respectively as the phases present for a particular time of measurement. However, the receivers can only detect instantaneous phase of the radio source carrier wave 310 at each antenna and cannot measure the whole number of cycles of the radio source carrier wave 310 that exist between 'antenna i' 320 and 'antenna j' 340. Thus, there is an integer ambiguity 380 associated with the baseline 325 comprising the ambiguous whole number of cycles of the radio source carrier wave 310 which lie between 'antenna i' 320 and 'antenna j' 340. The integer ambiguity 380 thus creates an ambiguity in the exact number (whole plus fractional) of cycles of the radio source carrier wave 310 that lie between 'antenna i' 320 and 'antenna j' 340. From the reported fractional phase difference of 0.5 (0.5 minus 0.0) between 'antenna i' 320 and 'antenna j' 340, the exact phase difference of the radio source carrier wave 310 could be 0.5+N where N is any integer value. A set of possible locations for antenna j 370 corresponding to N=−1 to 3 are depicted, wherein the actual location of 'antenna j' 340 corresponds to N=2.

As one skilled in the art would recognize, in the absence of measurement error or other bias, and assuming the distance from the radio wave source 305 is large in comparison to the magnitude of the baseline 325, the exact number of cycles of the radio source carrier wave 310 may be used to reliably resolve the integer ambiguity 380 and thereafter determine the baseline 325.

For example, assuming there are n radio wave sources such as radio wave source 305 sensed by 'antenna i' 320 and 'antenna j' 340 without measurement error or other bias, the difference between the carrier phase measurements taken simultaneously at 'antenna i' 320 and 'antenna j' 340 is related to a simple dot product as follows:

$$\phi_i^K - \phi_j^K = (LOS^K \cdot b_{ij})/\lambda \qquad (1)$$

where
$\phi_i^K$=Carrier phase measured at antenna i for radio source K (units of wavelengths)
$\phi_j^K$=Carrier phase measured at antenna j for radio source K
$b_{ij}$=Baseline vector representing position of antenna i relative to antenna j
$LOS^K$=Line-of-sight unit vector pointing toward radio source
$\lambda$=Carrier wavelength
and K=1, ..., n.

Taking the measurements for n radio carrier wave sources, a set of n equations similar to Equation 1 results which may be rewritten as a matrix equation:

$$SD_{ij} = [LOS]b_{ij}/\lambda \qquad (2)$$

where
- $SD_{ij}$ = n×1 matrix of carrier phase single differences for the antenna pair
- LOS = n×3 matrix of line-of-sight unit vectors toward the n radio sources.

If n=3, this equation can be solved for the baseline vector $b_{ij}$:

$$b_{ij} = \lambda[\text{LOS}^{-1}]SD_{ij} \quad (3)$$

More generally, if n≥3, the least squares solution for $b_{ij}$ becomes $$b_{ij} = \lambda P SD_{ij} \quad (4)$$

where the pseudoinverse matrix P is $$P = [\text{LOS}^T \text{LOS}]^{-1} \text{LOS}^T \quad (5)$$

and resulting from the least squares solution for the baseline vector $b_{ij}$ is a least squares residual:

$$e_{ij} = SD_{ij} - [\text{LOS}][P]SD_{ij} \quad (6)$$

However, in practice measurement error and other bias typically are present. One type of bias is a line bias, $\Delta t_{Lij}$. A clock bias $\Delta t_{Cij}$ can arise when the clock 338 is not common to each receiver. In one embodiment of the invention a non-common clock is used while another embodiment of the invention uses a common clock. When a common clock is used there is no clock bias or there is an identifiable constant or nearly constant clock bias. In order that one may understand and practice the invention using either a common or non-common clock, an embodiment with the clock bias will be discussed. One skilled in the art will recognize that assuming a constant clock bias is equivalent to illustrating an embodiment with a common clock for the purposes of describing, understanding and practicing the present invention.

A "corrected" or "sensed" phase difference is derived from the raw measured phase difference by accounting for a measurement error term that is related to clock differences but which cannot be eliminated by double differencing.

If the measurements from a particular pair of antenna-receiver units are not taken at precisely the same time, an error source will appear in the measurement of phase single differences due to the fact that a constellation of radio sources (for example satellites) may be in motion. During the interval between measurements by two GPS receivers, for example, the GPS satellite constellation will have in fact moved enough to significantly affect the measured phase difference.

Even between independent receivers, firmware features typically regulate the epoch to within 1 ms of the top of the GPS second, so clock bias between receivers is typically on the order of 1 ms or less. In 1 ms, a GPS satellite will move on the order of 3 m. While the resulting change in the line of sight vector to the satellite is of no practical consequence, the change in range to satellite has a nonnegligible effect on the phase difference measurement and therefore must be corrected for.

The corrected or sensed phase difference is thus related to the raw measured phase difference by the expression $$(\phi_i^K - \phi_j^K)_S = (\phi_i^K - \phi_j^K)_M + \frac{\dot{r}^K}{\lambda}\Delta t_{Cij} \quad (23)$$

where
- $(\phi_i^K - \phi_j^K)_S$ = sensed phase difference for antenna-receiver pair ij and radio source K
- $(\phi_i^K - \phi_j^K)_M$ = measured phase difference for antenna-receiver pair ij and radio source K
- $\dot{r}^K$ = rate of change of range from observer to radio source K
- $\lambda$ = carrier wavelength
- $\Delta t_{Cij}$ = actual time of measurement at receiver j minus that at receiver i (also known as "receiver clock bias")

While the satellite range rate $\dot{r}^K$ is typically much smaller than the speed of wave propagation c, it has the property of being satellite-specific. Therefore, double differencing will not eliminate its effect on the phase measurement; in practice the phase difference measurements for individual satellites must be corrected by this term before any further processing takes place. Correcting for this term is desirable even in the case of a common-clock architecture that results in an easily estimated but non-zero clock bias.

The correction term $$\frac{\dot{r}^K}{\lambda}\Delta t_{Cij}$$

can be adequately applied using even a coarse estimate of receiver clock bias. For example, for multiple independent GPS receivers, by taking the difference in GPS time solutions from independent receivers, one can arrive at a very coarse estimate of clock bias that is typically accurate to within about 300 ns. This uncertainty corresponds to about 100 m of carrier wave propagation but a maximum of only about 1 mm of change in satellite range. Therefore, this coarse clock bias estimate is adequate to make the needed correction to phase difference for satellite motion during the interval between receiver measurement epochs.

There are numerous ways to estimate the satellite range rate for use in this correction term, including ephemeris calculations and using the carrier wave Doppler shift. In one embodiment, a difference in whole carrier phases between sequential measurements is used.

Reconsidering Equation 1 with measurement error and bias included and separating terms to reflect the integer ambiguity 380 the exact phase difference of the radio source carrier wave 310 between 'antenna i' 320 and 'antenna j' 340 may be expressed as:

$$(\phi_i^K - \phi_j^K) = \left[(\phi_i^K - \phi_j^K)_S + \frac{c}{\lambda}(\Delta t_{Cij} + \Delta t_{Lij})\right] + N_{ij}^K - \upsilon_{ij}^K \quad (8)$$

where
- $(\phi_i^K - \phi_j^K)_S$ = sensed phase difference for antenna-receiver pair ij and radio source K
- C = speed of propagation of carrier wave
- $\lambda$ = carrier wavelength
- $\Delta t_{Cij}$ = actual time of measurement at receiver j minus that at receiver i; the "clock bias" for the receiver ij pair
- $\Delta t_{Lij}$ = receiver-antenna propagation delay for receiver-antenna unit i minus that for receiver-antenna unit j; the "line bias" for the ij receiver-antenna pair $N_{ij}^K$=integer for antenna pair ij and radio source K
$v_{ij}^K$=measurement noise for antenna-receiver pair ij and radio source K Stacking all the measurements for n satellites yields $$SD_{ij} = SD_{ij_S} + \frac{c}{\lambda}(\Delta t_{Cij} + \Delta t_{Lij}) + N_{ij} - v_{ij} \qquad (9)$$

where
$SD_{ij_S}$=n×1 matrix of sensed carrier phase single differences for antenna pair ij
$N_{ij}$=n×1 matrix of single-difference integers for antenna pair ij
$v_{ij}$=n×1 matrix of measurement noise for antenna-receiver pair ij.

One skilled in the art will recognize that while the foregoing has been illustrated in terms of single differences of sensed carrier phase, that double differences may be used without limitation. When using a common clock architecture, single differences are preferably used.

One embodiment of the invention uses double differences. More specifically, subtracting the measurements corresponding to one radio wave source from other measurements eliminates the clock bias and the line bias terms to yield:

$$DD_{ij} = DD_{ij_S} + N_{ij_D} - v_{ij_D} \qquad (10)$$

where
$DD_{ij_S}$=(n−1)×1 matrix of sensed carrier phase double differences for antenna pair
$ND_{ij_D}$=(n−1)×1 matrix of double-difference integers for antenna pair ij
$v_{ij_D}$=(n−1)×1 matrix of double-difference measurement noise.

In either the case of single differences or double differences, a geometrically feasible set of integers may be established reflecting the feasible phase difference between an antenna pair separated by a known distance.

In particular, if two antennas are separated from one another by a known distance, then for any particular carrier wave source emanating from any particular direction, the carrier phase difference for the pair of antennas is bounded by $$|\phi_i^K - \phi_j^K| \leq L/\lambda \qquad (11)$$

where
L=Known distance between antennas i and j
λ=Carrier wavelength.

Considering first the case of single differences, in the previous expression for phase difference, the term in brackets can be replaced with its fractional portion with no loss of generality, since the term $N_{ij}^K$ can take on any integer value.

$$(\phi_i^K - \phi_j^K) = frac\left[(\phi_i^K - \phi_j^K)_S + \frac{c}{\lambda}(\Delta t_{Cij} + \Delta t_{Lij})\right] + N_{ij}^K - v_{ij}^K \qquad (12)$$

If $v_{ij}^K$ is taken to be zero, bounds on $N_{ij}^K$ can be established as follows:

$$|\phi_i^K - \phi_j^K| = \left|frac(\phi_i^K - \phi_j^K)_S + \frac{c}{\lambda}(\Delta t_{Cij} + \Delta t_{Lij}) + N_{ij}^K\right| \leq L/\lambda \qquad (13)$$

where the fractional portion is calculated such that $$-0.5 \leq \left|frac\left[(\phi_i^K - \phi_j^K)_S + \frac{c}{\lambda}(\Delta t_{Cij} + \Delta t_{Lij})\right]\right| \leq 0.5 \qquad (14)$$

Then, $$|N_{ij}^K| \leq L/\lambda + 0.5 \qquad (15)$$

In the illustrative embodiment of the invention values of measurement noise $v_{ij}^K$ are typically much less than a wavelength. In the worst practical case, the addition of noise can expand the range of possible integers to $$|N_{ij}^K| \leq L/\lambda + 0.5 + |v_{ij}^K|_{max} \qquad (16)$$

Analogously for embodiments using double differences, the exact phase differences have representation:

$$(\phi_i^K - \phi_j^K) - (\phi_i^M - \phi_j^M) = frac[(\phi_i^K - \phi_j^K)_S - (\phi_i^M - \phi_j^M)_S] + N_{ij}^K - N_{ij}^M - v_{ij}^K + v_{ij}^M \qquad (17)$$

or $$DD_{ij}^{KM} = fac[DD_{ij}^{KM}{}_S] + N_{ij}^{KM} - v_{ij}^{KM} \qquad (18)$$

where the double-difference quantities for antenna pair ij and radio source pair KM are defined as follows:

$$DD_{ij}^{KM} \equiv (\phi_i^K - \phi_j^K) - (\phi_i^M \phi_j^M)$$

$$DD_{ij}^{KM}{}_S \equiv (\phi_i^K - \phi_j^K)_S - (\phi_i^M - \phi_j^M)_S$$

$$N_{ij}^{KM} \equiv N_{ij}^K - N_{ij}^M$$

$$v_{ij}^{KM} \equiv v_{ij}^K - v_{ij}^M \qquad (19a-d)$$

Now the integer search can be carried out by choosing candidate values of $N_{ij}^{KM}$ and proceeding in similar fashion to the method just outlined for the single-difference integer search.

However, the range of integers that must be considered with a double-difference search technique is greater than that for the single-difference case. Analogous to single-difference integers, the following range of values for double-difference integers can be established:

$$|N_{ij}^{KM}| \leq 2L/\lambda + 0.5 \qquad (20)$$

In accordance with embodiments of the invention, a relatively short baseline greater than one-half of the wavelength 90 may be chosen, for instance L=0.8λ. Assuming that $|v_{ij}^K| < 0.2\lambda$, we have $$|N_{ij}^K| \leq 0.8 + 0.5 \qquad (21)$$

in the case of single differences or, in the case of double differences, $$|N_{ij}^{KM}| \leq 1.6 + 0.5 \qquad (22)$$

Considering the implications of Equation 21, one skilled in the art will recognize that for this choice of L, there are three possible values for each integer, {−1,0,1}. For a single baseline then, the total number of possible integer combinations assuming there are n radio wave sources measurements is $3^n$, which for 8 radio wave sources is 6,561 possibilities. In general, the number of possible integer sets will be $(r_s)^n$, where $r_s$ is the number of integers that fall within the range of possible single-difference integers.

The resulting range for the double-difference integer search and the combinatorial consequences of a straightforward search through this entire range can be summarized in an analogous way to those for the single-difference integer search. The number of possible double-difference integer combinations becomes $(r_D)^{n-1}$, where $r_D$ is the number of double-difference integers within the range. (The exponent is n−1 rather than n because there are one fewer double-difference integers than there are single-difference integers.) In accordance with an embodiment of the invention, if a particular satellite is chosen as the "master satellite", say, satellite M, and the double differences are all derived by subtracting that particular measurement from the measurements corresponding to the other satellites, a convenient situation results. Because the double-difference integers are in fact each the difference of a particular satellite's single-difference integer and the master satellite's single-difference integer, all members of the set of double difference integers for a particular antenna pair must lie within a particular range of one another, that range being the range of possible master satellite single-difference integers.

Using this fact, the integer search procedure can consist of $r_S$ subsearches corresponding to $r_S$ values of the master satellite's single-difference integer. Each of these subsearches comprises a search through $(r_{NM})^{n-1}$ single-difference integer combinations for the remaining n−1 satellite measurements. The "non-master" integer range $r_{NM}$ is the number of integers that must be included to ensure that all possible double-difference integer sets are examined, given the range of values of the single-difference master integer. The required value of $r_{NM}$ is the same as $r_S$ for all antenna separations except those between x.25 and x.50 wavelengths (x being any integral value), where a transition region exists. Using this approach, the number of double-difference integer combinations that must be searched changes from $(r_D)^{n-1}$ to $r_S(r_{NM})^{n-1}$, which is equal to $(r_S)^n$ for most antenna separations.

For an embodiment:)f the invention sensing carrier sources from 8 satellites, the integer range and number of potentially possible candidate integer sets for single-difference and double-difference integers is summarized below through a range of inter-antenna separations L

| L/λ | Single-difference Integer Range | Double-difference Integer Range | $r_S$ | $r_{NM}$ | Number of Integer Set Candidates for n = 8 (Single-Difference Search) $(r_S)^n$ | Number of Integer Set Candidates for n = 8 (Double-Difference Search) $r_S(r_{NM})^{n-1}$ |
|---|---|---|---|---|---|---|
| <0.25 | 0 | 0 | 1 | 1 | 1 | 1 |
| 0.25–0.50 | 0 | −1,...1 | 1 | 3 | 1 | 2,187 |
| 0.50–0.75 | −1,...1 | −1,...1 | 3 | 3 | 6,561 | 6,561 |
| 0.75–1.00 | −1,...1 | −2,...2 | 3 | 3 | 6,561 | 6,561 |
| 1.00–1.25 | −1,...1 | −2,...2 | 3 | 3 | 6,561 | 6,561 |
| 1.25–1.50 | −1,...1 | −3,...3 | 3 | 5 | 6,561 | 234,375 |

-continued

| L/λ | Single-difference Integer Range | Double-difference Integer Range | $r_S$ | $r_{NM}$ | Number of Integer Set Candidates for n = 8 (Single-Difference Search) $(r_S)^n$ | Number of Integer Set Candidates for n = 8 (Double-Difference Search) $r_S(r_{NM})^{n-1}$ |
|---|---|---|---|---|---|---|
| 1.50–1.75 | −2,...2 | −3,...3 | 5 | 5 | 390,625 | 390,625 |
| 1.75–2.00 | −2,...2 | −4,...4 | 5 | 5 | 390,625 | 390,625 |
| 2.00–2.25 | −2,...2 | −4,...4 | 5 | 5 | 390,625 | 390,625 |
| 2.25–2.50 | −2,...2 | −5,...5 | 5 | 7 | 390,625 | 4,117,715 |
| 2.50–2.75 | −3,...3 | −5,...5 | 7 | 7 | 5,764,801 | 5,764,801 |
| 2.75–3.00 | −3,...3 | −6,...6 | 7 | 7 | 5,764,801 | 5,764,801 |
| 3.00–3.25 | −3,...3 | −6,...6 | 7 | 7 | 5,764,801 | 5,764,801 |
| 3.25–3.50 | −3,...3 | −7,...7 | 7 | 9 | 5,764,801 | 33,480,783 |
| 3.50–3.75 | −4,...4 | −7,...7 | 9 | 9 | 43,046,721 | 43,046,721 |
| 3.75–4.00 | −4,...4 | −8,...8 | 9 | 9 | 43,046,721 | 43,046,721 |

Figure 4:
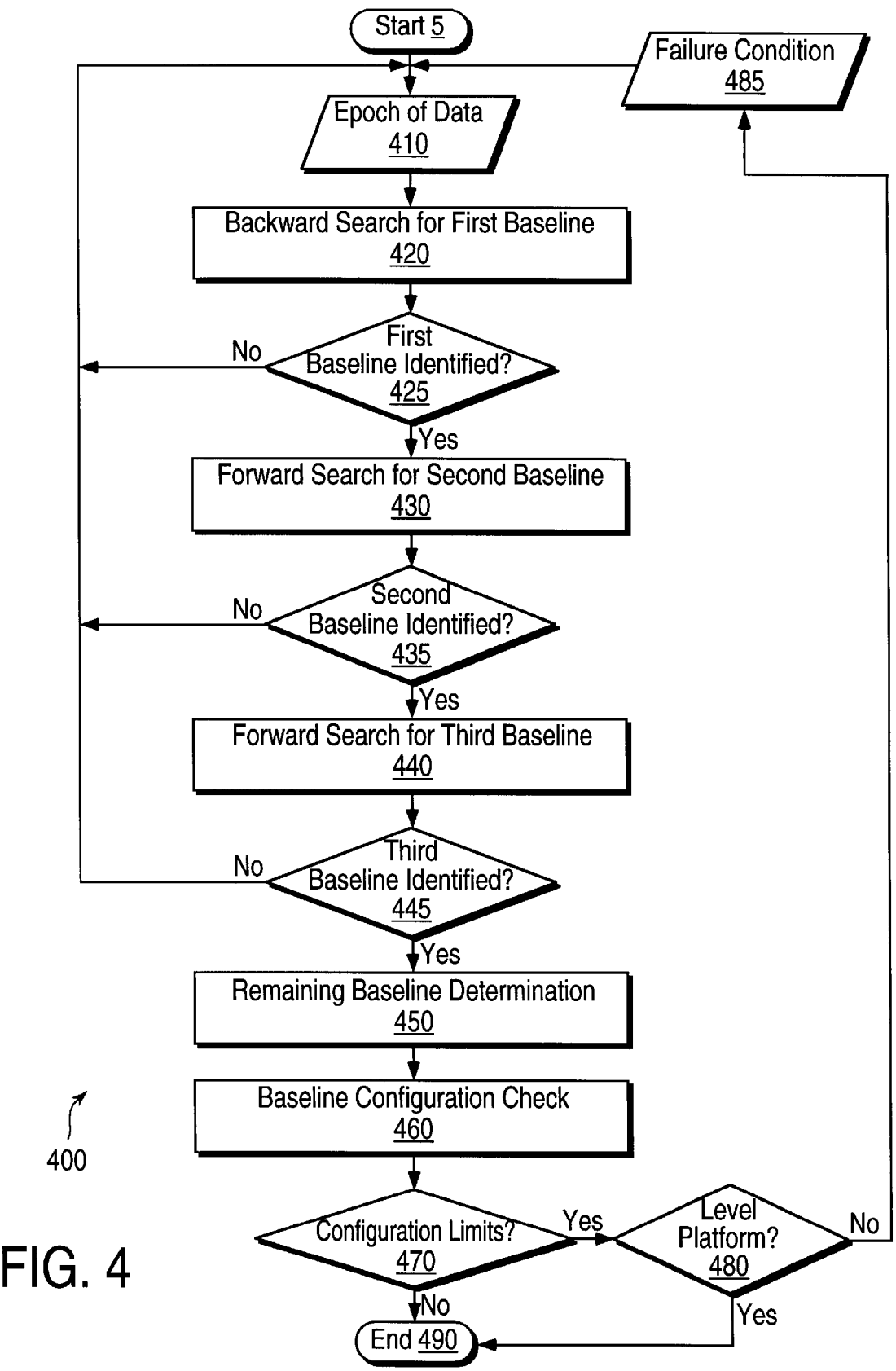
FIG. 4 depicts an 'inter-antenna baseline determination' process in accordance with an illustrative embodiment.

FIG. 4 illustrates an 'inter-antenna baseline determination' process 400. In accordance with an embodiment of the invention, the process 400 operates with the antenna configuration 200 and antenna-receiver units 330 previously discussed. The 'inter-antenna baseline determination' process 400 initiates at a 'start' terminal 405 and continues to receive an 'epoch of data' input block 410. Measured phases are reported from the antenna-receiver units, such as the 'antenna-receiver' unit 330. Sensed phases are generated from the measured phases through Equation 23 and the sensed phases are reported in the 'epoch of data' input block 410. Processing continues to a 'backward search for first baseline' procedure 420 that performs a backward search procedure to determine a first baseline as will be discussed in greater detail in connection with FIG. 5. If the 'backward search for first baseline' procedure 420 reports a failure to determine the first baseline, a 'first baseline identified' decision procedure 425 exits along its 'no' branch and processing returns to receive another 'epoch of data' input block 410. If the 'backward search for first baseline' procedure 420 successfully determines the first baseline, the 'first baseline identified' decision procedure 425 exits through its 'yes' branch and processing continues to a 'forward search for second baseline' procedure 430. As will be discussed in greater detail in connection with FIG. 6, the 'forward search for second baseline' procedure 430 determines a second baseline or reports a failure condition. If the failure condition is reported a 'second baseline identified' decision procedure 435 exits through its 'no' branch and processing returns to await another 'epoch of data' input block 410. If the second baseline is determined, the 'second baseline identified' decision procedure 435 exits through its 'yes' branch and processing continues to a 'forward search for third baseline' procedure 440. As will be discussed in greater detail in connection with FIG. 7, the 'forward search for third baseline' procedure 440 determines a third baseline or reports a failure condition. If the failure condition is reported a 'third baseline identified' decision procedure 445 exits through its 'no' branch and processing returns to await another 'epoch of data' input block 410. If the third baseline is determined, the 'third baseline identified' decision procedure 445 exits through its 'yes' branch and processing continues to a 'remaining baseline determination' procedure 450 that determines the remaining baselines in the antenna configuration 200. The first, second, and third baselines having been determined, the integers that resolve their associated integer ambiguities are known and are used to compute the remaining baselines using ordinary geometry well known in the art and the least squares residual for the remaining baselines is calculated.

A 'baseline configuration check' procedure 460 next checks the integrity of the set of baselines. One embodiment of the invention checks whether the maximum magnitude of residual vector elements is less than 0.22 GPS L1 wavelengths and whether the mean value of residual vector elements for all baselines is less than 0.08 GPS L1 wavelengths. If these checks are not satisfied, the process 400 begins on a new epoch of data 410. Otherwise, a 'configuration limits' decision procedure 470 begins. Embodiments of the invention allow for limits to be placed on array attitude values. If this is desired, the 'configuration limits' decision procedure 470 exits through its 'yes' branch and a 'level platform' decision procedure 480 is entered. The 'level platform' decision procedure 480 tests whether the previously-determined baselines are consistent with a platform with which the antenna array is used being level within a predetermined range, for example +/−20 degrees. This test condition may be used as a final quality check for platforms which are nominally level, for example a ship. One skilled in the art will appreciate that a similar procedure could be used with a non-level fixed-attitude platform, for example a conventional landing gear aircraft. Conveniently, an inclinometer could generate a nominal attitude for a non-level fixed attitude platform.

If the previously-determined baselines are inconsistent with the platform being level within the predetermined range, the 'level platform' decision procedure 480 exits through its 'no' branch and a 'failure condition' output block 485 is reported for this epoch of data. The procedure then completes through an 'end' terminal 490.

One skilled in the art will recognize that a coarse estimate of two orientation angles is obtained through the determination of the first baseline $b_{32}$ by the 'backward search for first baseline' procedure 420. One skilled in the art will further recognize that a coarse estimate of two orientation angles may be otherwise obtained, for example from a solid state inclinometer and/or magnetometer, and the remaining functional elements depicted in FIG. 4 may be used with the coarse estimate so obtained.

Figure 5A:
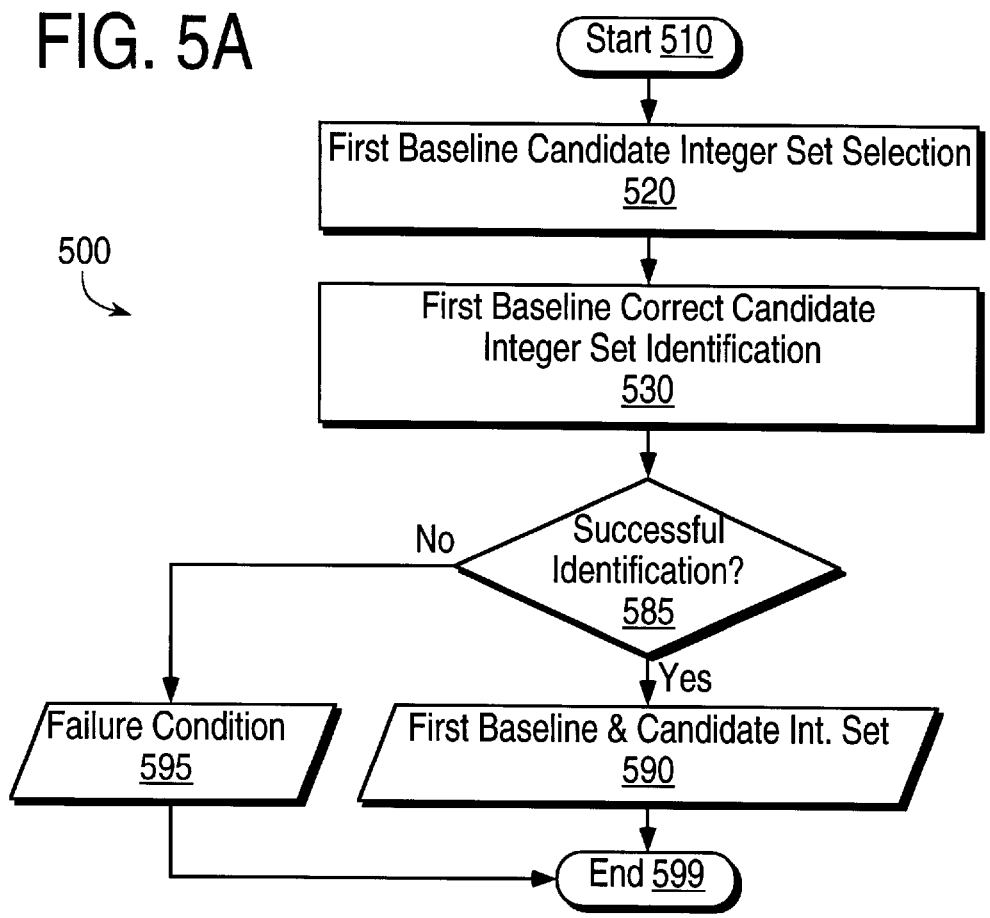
FIG. 5A depicts a 'first baseline determination' process in accordance with an illustrative embodiment.

FIG. 5A illustrates a 'first baseline determination' process 500 that is invoked by the 'backward search for first baseline' procedure 420. Processing initiates at a 'start' terminal 510 and continues to a 'first baseline candidate integer set selection' procedure 520 and a 'first baseline correct candidate integer set identification' procedure 530 that will be discussed in greater detail with respect to FIG. 5B and FIG. 5C, respectively. Briefly here, all geometrically feasible candidate integers are selected and then searched for a uniquely best baseline candidate to identify as the integer set for the first baseline. The underlying rationale for this is that if there are two candidate baselines that are insignificantly different, both should be rejected as the correctness of neither can be assured. Processing continues to a 'successful identification' decision procedure 585. If the 'first baseline correct candidate integer set identification' procedure 530 has identified a uniquely best baseline candidate, the 'successful identification' decision procedure 585 exits through its 'yes' branch and a 'first baseline and candidate integer set' output block 590 returns the identified first baseline and its associated candidate integer set. Otherwise, the 'successful identification' decision procedure 585 exits through its 'no' branch and a 'failure condition' output block 595 reports the identification failure to the calling process 400 that will cause the 'first baseline identified' decision procedure 425 to exit along its 'no' branch and receive the 'epoch of data' input block 410. Processing completes through an 'end' terminal 599.

Figure 5B:
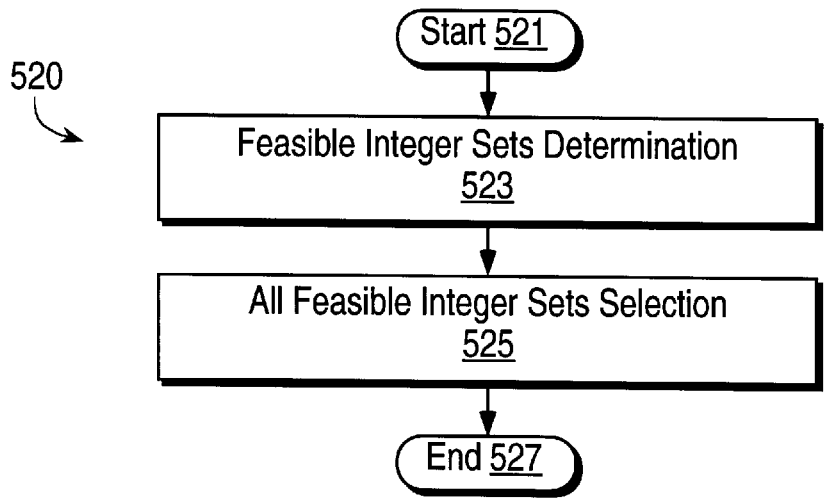
FIG. 5B depicts a 'first baseline candidate integer set selection' procedure in accordance with an illustrative embodiment.

FIG. 5B illustrates the 'first baseline candidate integer set selection' procedure 520 invoked by the 'first baseline determination' process 500. Processing initiates at a 'start' terminal 521 and continues to a 'feasible integer sets determination' procedure 523 that determines candidate integer sets that are geometrically feasible given the known magnitude of the first baseline to be determined. Recall that the first baseline $b_{32}$ is determined using the backward search procedure. This means that a search though all of the possible values of each integer of geometrically feasible integer sets will be conducted. Each of the integer sets will be tested for the quality of the solution they would provide for the first baseline $b_{32}$. Thus, all feasible integer sets need to be selected for further processing. An 'all feasible integer sets selection' procedure 525 performs this function and processing completes through an 'end' terminal 527.

Figure 5C:
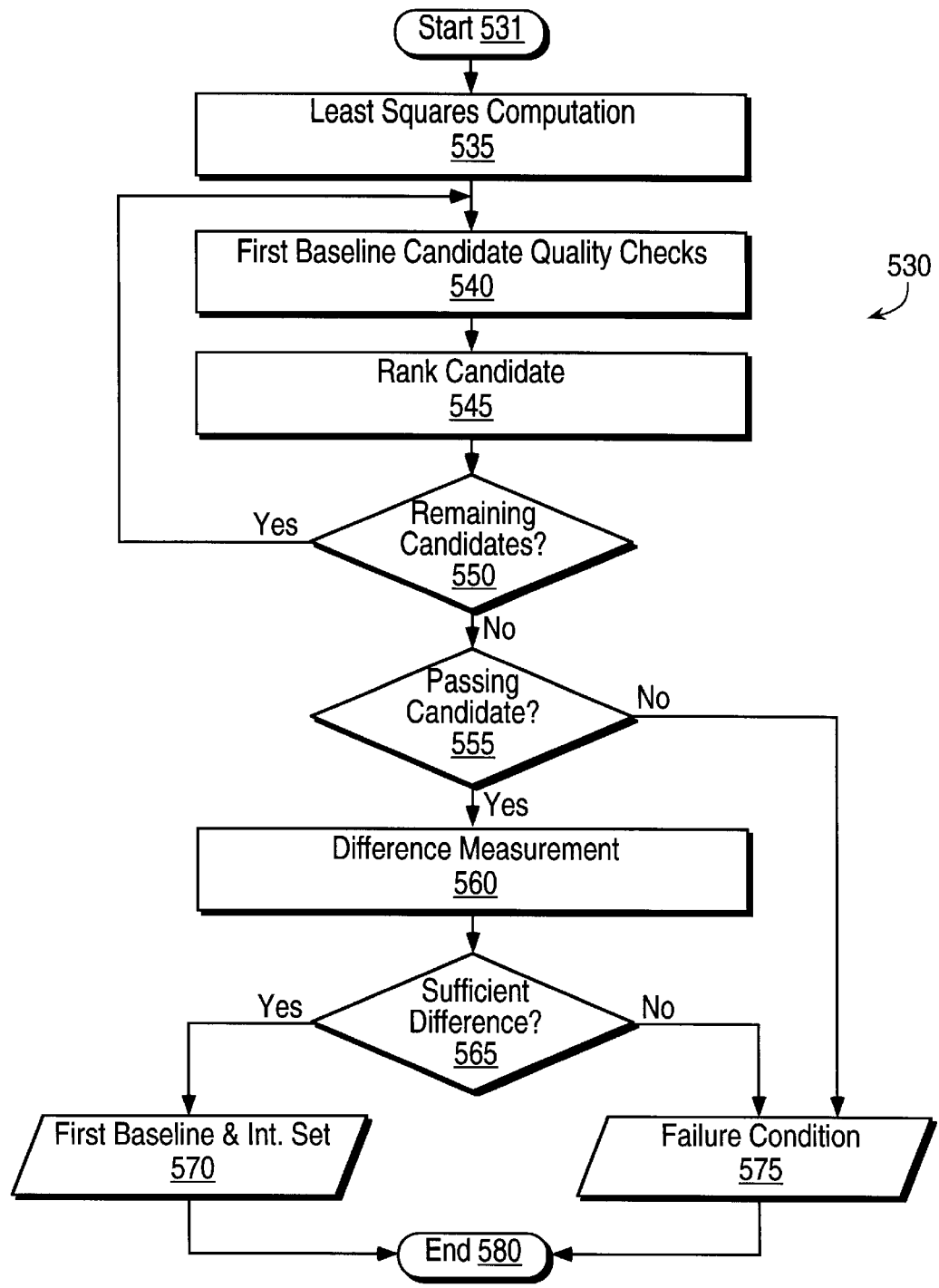
FIG. 5C depicts a 'first baseline correct candidate integer set selection' procedure in accordance with an illustrative embodiment.

FIG. 5C depicts the 'first baseline correct candidate integer set selection' procedure 530 invoked by the 'first baseline determination' process 500. Processing initiates at a 'start' terminal 531 and continues to a 'least squares computation' procedure 535. For each of the candidate integer sets returned by the 'first baseline candidate integer set selection' procedure 520, a candidate baseline is computed using least squares along with its associated least squares solution residual and processing enters an iterative block. A 'first baseline candidate quality checks' procedure 540 performs two quality checks on the particular candidate integer set. First is a baseline magnitude check which is satisfied when the baseline candidate computed by the 'least squares computation' procedure 535 for a given candidate integer set is within a first predetermined range. In the illustrative embodiment, the first predetermined range is 0.15 GPS L1 wavelengths of the known magnitude of the baseline. Second is a least squares solution residual check that is satisfied when the magnitude of the least squares solution residual vector associated with the baseline candidate falls within a second predetermined range. In the illustrative embodiment, the second predetermined range is 0.13 GPS L1 wavelengths. If either test is not satisfied, the baseline candidate is removed from further consideration. A 'rank candidate' procedure 545 then assigns a rank to baseline candidates passing both quality checks based on their least squares solution residual with higher rankings corresponding to smaller residuals. Iteration continues until a 'remaining candidates' decision procedure 550 exits through its 'no' branch indicating all of the baseline candidates have been considered. Processing continues to a 'passing candidate' decision procedure 555 that exits through its 'no' branch to execute a 'failure condition' output block 575 if no baseline candidate has passed the baseline quality checks. Otherwise the highest ranked and next highest ranked passing baseline candidates are returned to a 'difference measurement' procedure 560. The 'difference measurement' procedure 560 computes a difference measure between the highest ranked baseline candidate and the next highest ranked baseline candidate. In one embodiment of the invention the difference measure is the difference between the magnitudes of the least squares solution residual. A 'sufficient difference' decision procedure 565 receives the difference measure. If the difference measure is above a predetermined threshold, the 'sufficient difference' decision procedure 565 exits through its 'yes' branch. In the illustrative embodiment, the predetermined threshold is 0.05 GPS L1 wavelengths. When this occurs, a 'first baseline and candidate integer set' output block 570 returns the highest ranked baseline candidate and its associated candidate integer set to the calling process 500 and processing completes through an 'end' terminal 580. If the difference measure is not above the predetermined threshold, the 'sufficient difference' decision procedure 565 exits through its 'no' branch and the 'failure condition' output block 575 returns an indication to the calling process 500 that identification of the first baseline $b_{32}$ was unsuccessful based on the epoch of data currently under consideration. Processing then completes through the 'end' terminal 580.

The previous discussion of FIG. 5A, FIG. 5B, and FIG. 5C described the backward integer search procedure to determine the first baseline in accordance with an illustrative embodiment of the invention. With reference to FIG. 4, processing has progressed until the 'first baseline identified' decision procedure 425 exits through its 'yes' branch.

Because of the desire for larger antenna separations to produce more precise attitude estimates, in the illustrative embodiment, the fourth antenna A4 and the first antenna A1 are located several wavelengths away from the second antenna A2 and the third antenna A3. This means that a single-epoch backward integer search procedure to resolve integer ambiguities associated with these antennas would be extraordinarily lengthy due to the vast number of integer set candidates, and also quite likely to result in incorrect integer set determination. Therefore, the successful conclusion of the 'first baseline determination' process 500, the integer search for the first baseline $b_{32}$, is now capitalized upon to carry out a forward integer search procedure for the integers associated with the second baseline $b_{43}$. A more complete description of the forward search for the second baseline follows.

Figure 6A:
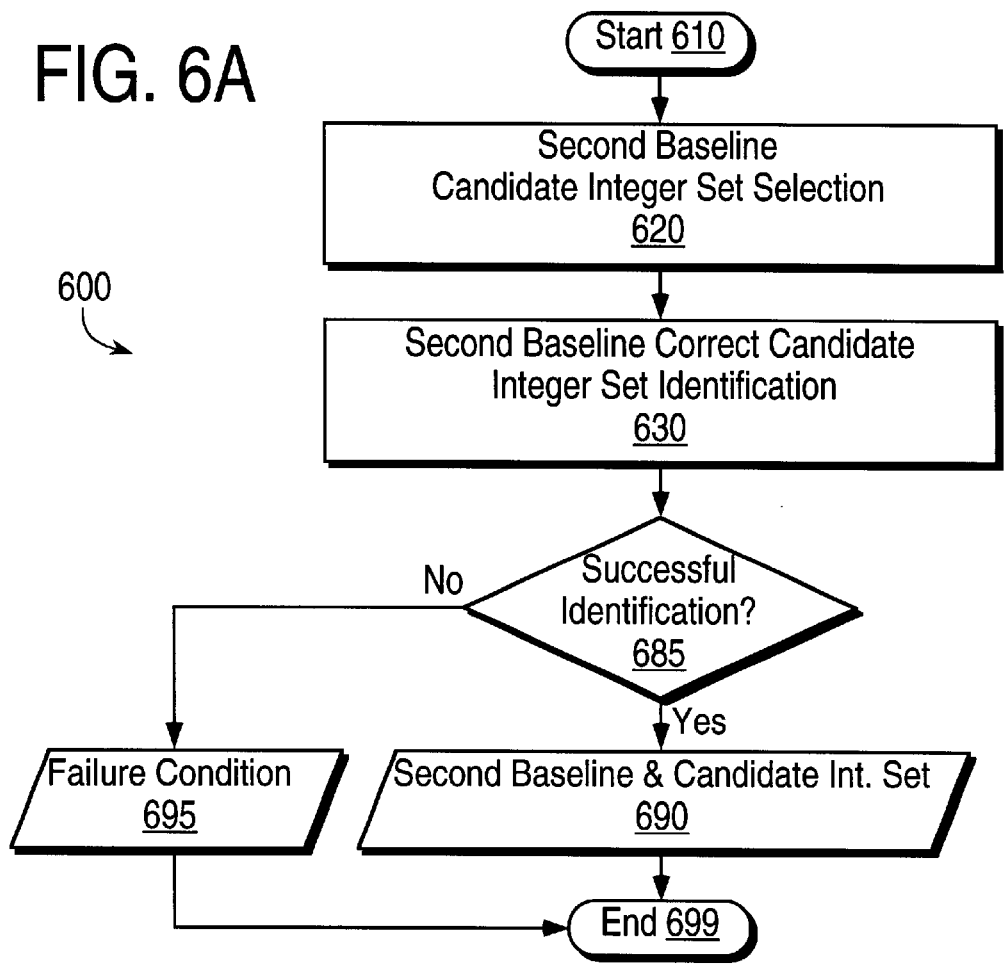
FIG. 6A depicts a 'second baseline determination' process in accordance with an illustrative embodiment.

FIG. 6A illustrates a 'second baseline determination' process 600 invoked by the 'forward search for second baseline' procedure 430. Processing initiates at a 'start' terminal 610. Broadly speaking, the 'second baseline determination' process 600 is similar to the 'first baseline determination' process 500 discussed in reference to FIG. 5A. The differences lie in the manner in which candidate integer sets are selected and the correct set identified by a 'second baseline candidate integer set selection' procedure 620 and a 'second baseline correct candidate integer set identification' procedure 630, respectively. A 'successful identification' decision procedure 685 exits through its 'yes' branch to a 'second baseline and candidate integer set' output block 690 or through its 'no' branch to a 'failure condition' output block 695 and processing completes through an 'end' terminal 699 in an analogous manner to what was described with respect to the corresponding functional elements depicted in FIG. 5A, the 'successful identification' decision procedure 585, the 'first baseline and candidate integer set' output block 590, and the 'failure condition' output block 595.

Figure 6B:
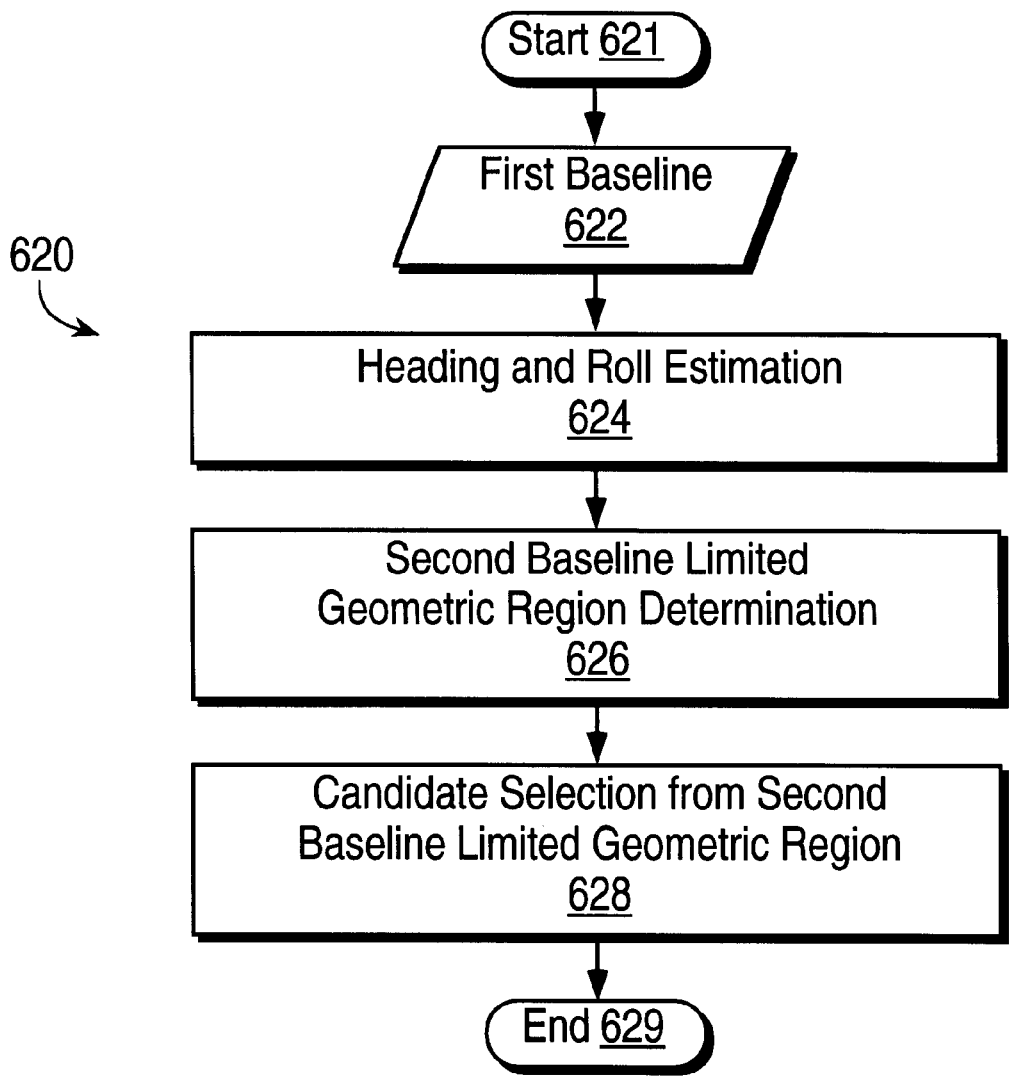
FIG. 6B depicts a 'second baseline candidate integer set selection' procedure in accordance with an illustrative embodiment.

The 'second baseline candidate integer set selection' procedure 620 is shown in greater detail by FIG. 6B. Processing initiates at a 'start' terminal 621 and continues to a 'first baseline' input block 622 the presence of which reflects the fact that the first baseline $b_{32}$ is used to aid the search for the second baseline $b_{43}$. Next a 'heading and roll estimation' procedure 624 generates a coarse estimate of the heading and roll of the antenna configuration 200 based on the first baseline. More specifically, associated with the antenna configuration 200 is an antenna coordinate system consisting of a first coordinate unit vector C1, a second coordinate unit vector C2 and a third coordinate unit vector C3. The second coordinate unit vector C2 is taken parallel to $b_{42}$, the third coordinate unit vector C3 is taken parallel to the cross product $b_{42} \times b_{41}$ and the first coordinate unit vector is taken to complete a right-hand coordinate system. The 'heading and roll estimation' procedure 624 estimates heading and roll angles of the antenna coordinates with respect to local-vertical local-horizontal Earth-fixed coordinate system. One skilled in the art will recognize that selection of heading and roll from among the three orientation angles is not fundamental to the present invention.

Processing continues to a 'second baseline limited geometric region determination' procedure 626. Here, the heading and roll estimates are used in conjunction with the knowledge of the physical orientation and length of the second baseline b43 to determine a limited geometric region for the location of as yet unknown endpoint of the second baseline $b_{43}$, i.e. the location of the fourth antenna A4. The limited geometric region may be described as follows. Fixing the end of the second baseline located at the third antenna A3, rotate the baseline through a range of antenna configuration heading and roll values equal to the previously-computed heading and roll estimates plus/minus incremental offsets. The limited geometric region is the region swept out by the second baseline $b_{43}$, i.e. a region on whose longitudinal axis lies an approximate location of the fourth antenna A4. Determination of the limited geometric region for use in the forward integer search procedure is further discussed in connection with FIG. 8 below.

Next a 'candidate selection from second baseline limited geometric region' procedure 628 identifies candidate integer sets corresponding to points in the limited geometric region. In one embodiment of the invention the following relationships are used:

$$\overline{DD_{ij}} = [dLOS]\overline{b_{ij}}/\lambda$$

$$\overline{N_{ij}diD} = \text{round}(DD_{ijs} - \overline{DD_{ij}})$$

where bars above a quantity indicates that it is a baseline candidate value, $\overline{b_{ij}}$ is the second baseline $b_{43}$ appropriately rotated by the previously-estimated antenna coordinate system heading and roll plus/minus an incremental offset and the term "round" indicates the quantity rounded to the nearest integer. By iterating through the range of offsets, candidate integer sets in the limited geometric region are identified and processing completes through an 'end' terminal 629.

Figure 6C:
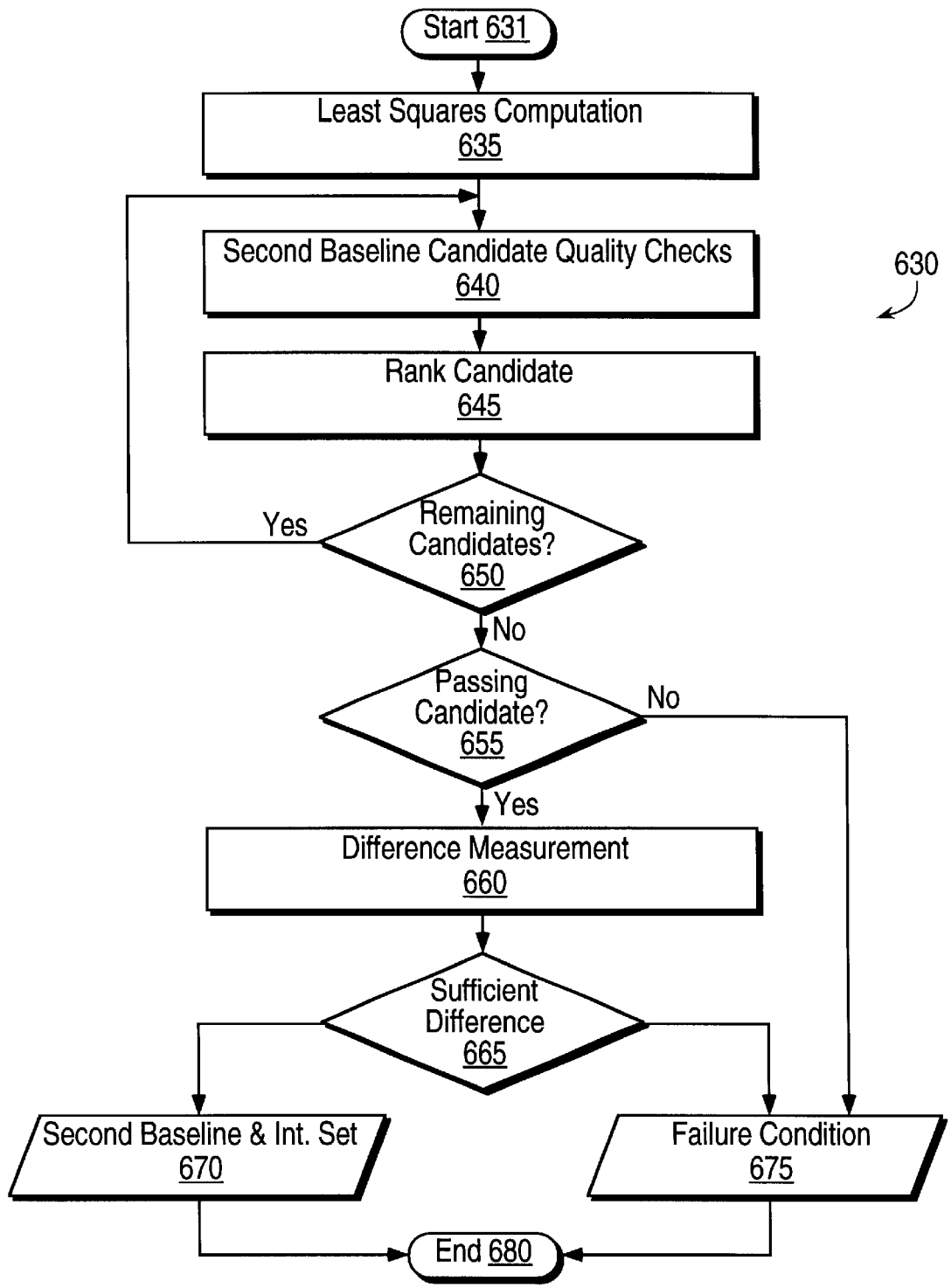
FIG. 6C depicts a 'second baseline correct candidate integer set selection' procedure in accordance with an illustrative embodiment.

Depicted in FIG. 6C is the 'second baseline correct candidate integer set selection' procedure 630 which receives the candidate integer sets selected by the procedure 620 previously described with reference to FIG. 6B. Processing initiates at a 'start' terminal 631 and continues to a 'least squares computation' procedure 635 that computes the least squares solution for the second baseline $b_{43}$ for candidate integer sets from the limited geometric region. The least squares solution residual is also computed. Next, a 'second baseline candidate quality checks' procedure 640 performs slightly different quality checks on the second baseline candidates than those performed by the 'first baseline candidate quality checks' procedure 540. In addition to the baseline magnitude check, and the least squares solution residual check, a score is computed for the second baseline candidate integer sets. The baseline magnitude check here is whether the magnitude of the second baseline $b_{43}$ is within 0.11 GPS L1 wavelengths of the known magnitude; the least squares solution residual check is wither the second baseline solution residual vector magnitude is less than 0.22 GPS L1 wavelengths. Additionally, in the illustrative embodiment, the error in the calculated angle between the first baseline $b_{32}$ and the second baseline $b_{43}$ is checked to verify it is below 15.0 degrees, and the baseline score is checked to verify that it is below a value of 0.9.

The score is a weighted sum of a baseline magnitude error, the least squares solution residual, and the absolute value of the angle error between the candidate the second baseline $b_{43}$ and the previously estimated first baseline $b_{32}$. The baseline magnitude error is the difference (in GPS L1 wavelengths) between the magnitude of the least squares solution for the second baseline candidate and the known magnitude of the second baseline $b_{43}$. In the illustrative embodiment, the weights are 10, 1, and 0.1 for the least squares solution residual, baseline magnitude error, and absolute value of the angle error, respectively.

One skilled in the art will recognize that imposition of the constraint that baseline candidates pass plural successive baseline quality tests improves the robustness of the baseline determination process.

Execution of the remainder of the procedure 630 is similar to the corresponding procedure discussed in connection with FIG. 5C. Briefly, a 'rank candidate' procedure 645 determines the highest and next highest ranked candidate (based on the least squares solution residual) through iteration over the candidates controlled by a 'remaining candidates' decision procedure 650; a 'passing candidate' decision procedure 655 reports a 'failure condition' output block 675 if there are not passing candidates. Otherwise a 'difference measurement' procedure 660 and a 'sufficient difference' decision procedure 665 determine if the highest ranked candidate is sufficiently different from the next highest ranked candidate. In the illustrative embodiment, this difference is whether the difference in the residual vectors of the best and second best candidates is greater than 0.05 GPS L1 wavelengths. If so a 'second baseline and candidate integer set' output block 670 reports the highest ranked candidate and its corresponding integer set; otherwise the 'failure condition' output block 675 is reported. Processing completes through an 'end' terminal 680.

Again making reference to FIG. 4, when processing has completed so the 'second baseline identified' decision procedure 435 exits through its 'yes' branch, the 'forward search for third baseline' procedure 440 initiates. Execution of the procedure 440 is similar to the 'forward search for second baseline' procedure 430 except for the determination of the candidate integer sets.

Figure 7A:
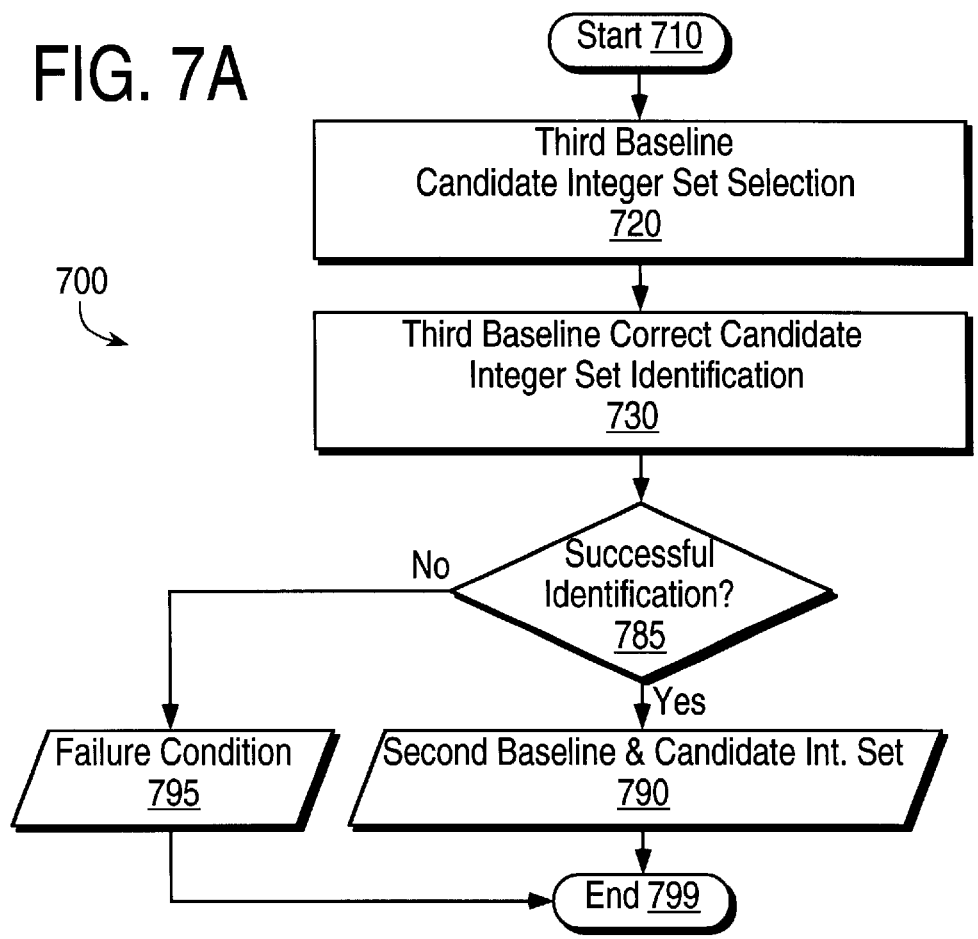
FIG. 7A depicts a 'third baseline determination' process in accordance with an illustrative embodiment.

FIG. 7A illustrates the 'third baseline determination' process 700 in greater detail. Processing initiates at a 'start' terminal 710 and continues to a 'third baseline candidate integer set selection' procedure 720 and a 'third baseline correct candidate integer set identification' procedure 730 that will be discussed in connection with FIG. 7B and FIG. 7C, respectively. Execution of the remainder of the 'third baseline determination' process 700 is similar to that of the procedures discussed previously in connection with FIG. 5A and FIG. 6A. Briefly, a 'successful identification' decision procedure 785 tests whether the third baseline $b_{21}$ was successfully identified. If so a 'third baseline and candidate integer set' output block 790 reports the third baseline $b_{21}$ and the corresponding integer set; otherwise a 'failure condition' output block 795 executes for this epoch of data. Processing completes through an 'end' terminal 799.

Figure 7B:
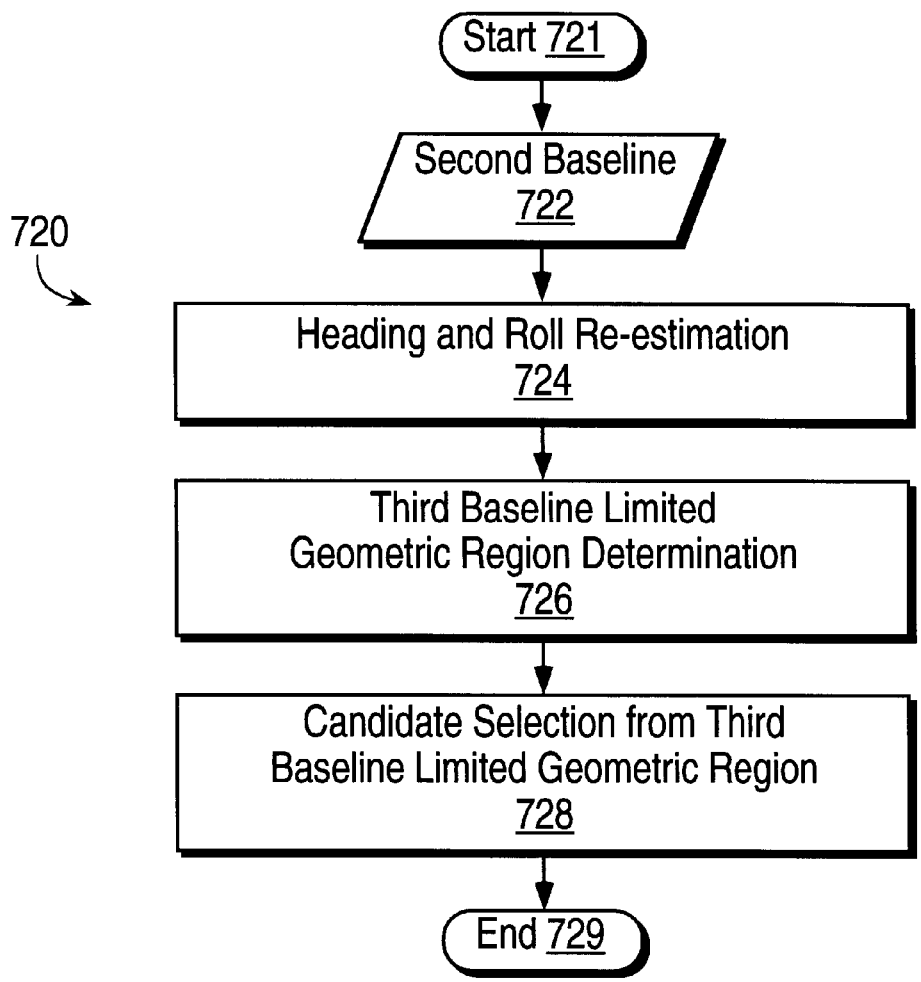
FIG. 7B depicts a 'third baseline candidate integer set selection' procedure in accordance with an illustrative embodiment.

Referring now to FIG. 7B, processing initiates at a 'start' terminal 721 and a 'second baseline' input block 722 receives the second baseline $b_{43}$ determined as described above in connection with FIG. 6A, FIG. 6B, and FIG. 6C. A 'heading and roll estimation' procedure 724 uses the second baseline $b_{43}$ to re-estimate the heading and roll angles of the antenna coordinate with respect local-vertical and local-horizontal Earth-fixed coordinates. Processing continues to a 'third baseline limited geometric region determination' procedure 726 and a 'candidate selection from third baseline limited geometric region' procedure 728. These procedures execute in a manner analogous to the corresponding procedures discussed in connection with FIG. 6B with the following exception: the third baseline limited geometric region is nearly planar. It corresponds to the region swept out by the third baseline $b_{21}$ adjacent to the second antenna A2 as antenna configuration pitch angles are varied through an appropriate angle range, for example +/−20 degrees. The width of the nearly planar region searched may be zero or may encompass a width of several degrees, constructed by incremental offsets in heading. Candidate integer sets are chosen from within this region in a manner similar that described in connection with FIG. 6B except the pitch and heading angles are offset rather than the heading and roll angles. One skilled in the art will recognize the concept described above is not limited to pitch and heading, but also encompasses other orientation angles. Processing completes through an 'end' terminal 729.

Figure 7C:
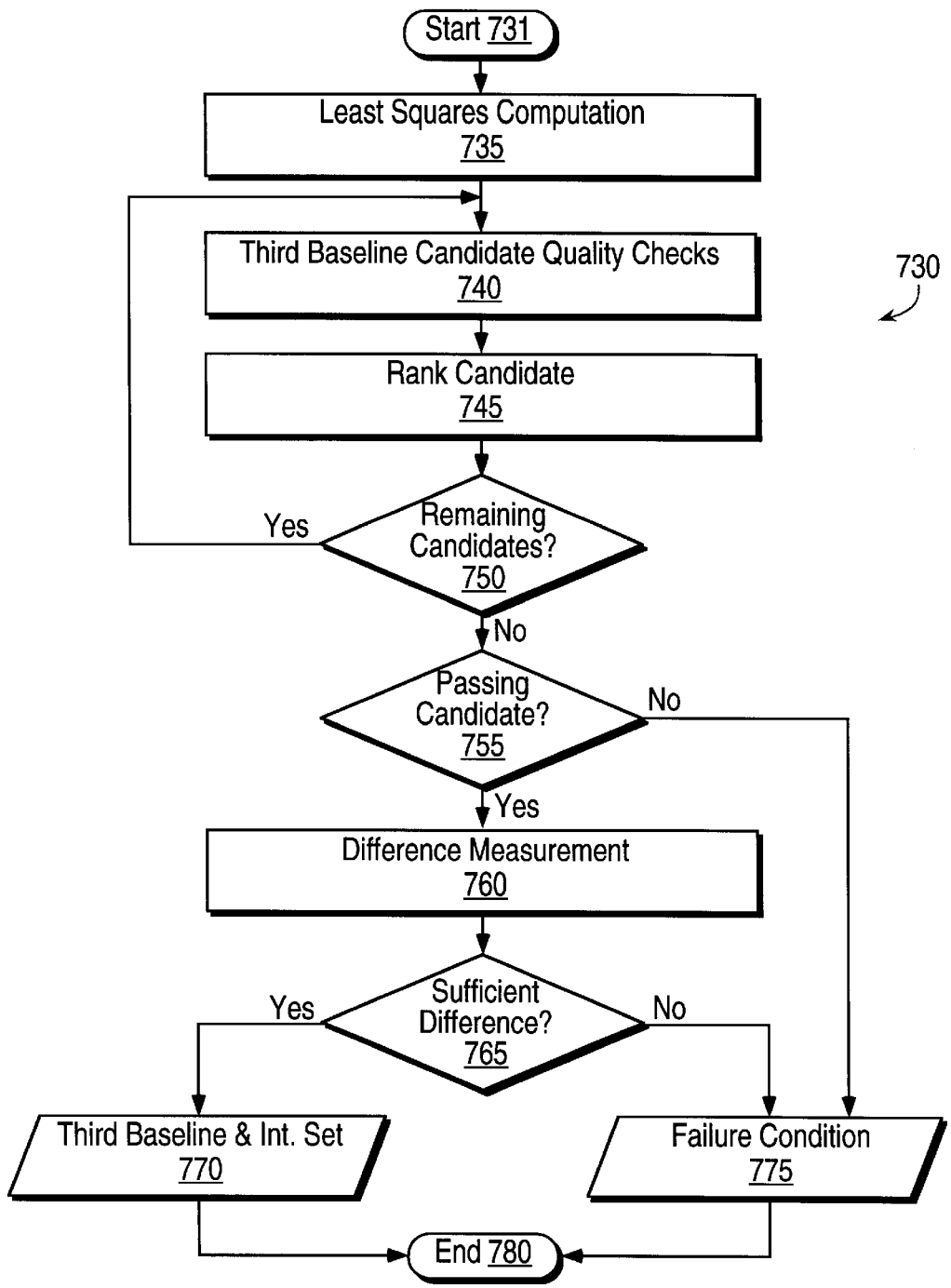
FIG. 7C depicts a 'third baseline correct candidate integer set selection' procedure in accordance with an illustrative embodiment.

The third baseline candidate integer sets having been selected, the 'third baseline determination' process 700 continues to a 'third baseline correct candidate integer set identification' procedure 730 as depicted in FIG. 7C. This procedure executes analogously to the 'second baseline correct candidate integer set identification' procedure 630 and reference should be made to the discussion of the procedure 630 for a description of the 'third baseline correct candidate integer set identification' procedure 730. Briefly, processing initiates at a 'start' terminal 731 and continues to a 'least squares computation' procedure 735 for computing the least squares solution and residuals of baseline candidates. An iterative block controlled by a 'remaining candidates' decision procedure 750 executes baseline quality tests at a 'third baseline candidate quality checks' procedure 740 and a 'rank candidate' procedure 745 assigns rank to candidates on the basis of a ranking criterion, for example the magnitude of the least squares residual. In the illustrative embodiment, the third baseline quality checks are whether the difference in magnitude of the third baseline from the known magnitude is less than 0.11 GPS L1 wavelengths; whether the magnitude of the residual vector is less than 0.10 GPS L1 wavelengths; whether the score for the third baseline is less than 1.3; and whether the error in the angle calculated between the second and third baselines is less than 7.0 degrees. When iteration is complete, a 'failure condition' output block 775 executes for this epoch of data if a 'passing candidate' decision procedure 755 determines no candidates passed the baseline quality tests. Otherwise a 'difference measurement' procedure 760 and a 'sufficient difference' decision procedure 765 function to test whether a highest ranked candidate and a next highest ranked candidate are sufficiently different. In the illustrative embodiment, the residual difference is tested to verify it is above 0.10 GPS L1 wavelengths. If so, the 'sufficient difference' decision procedure 765 exits through its 'yes' branch and a 'third baseline and candidate integer set' output block 770 reports the third baseline $b_{21}$ and the corresponding integer set; otherwise the 'failure condition' output block 775 executes for this epoch of data. Processing completes through an 'end' terminal 780.

Figure 8:
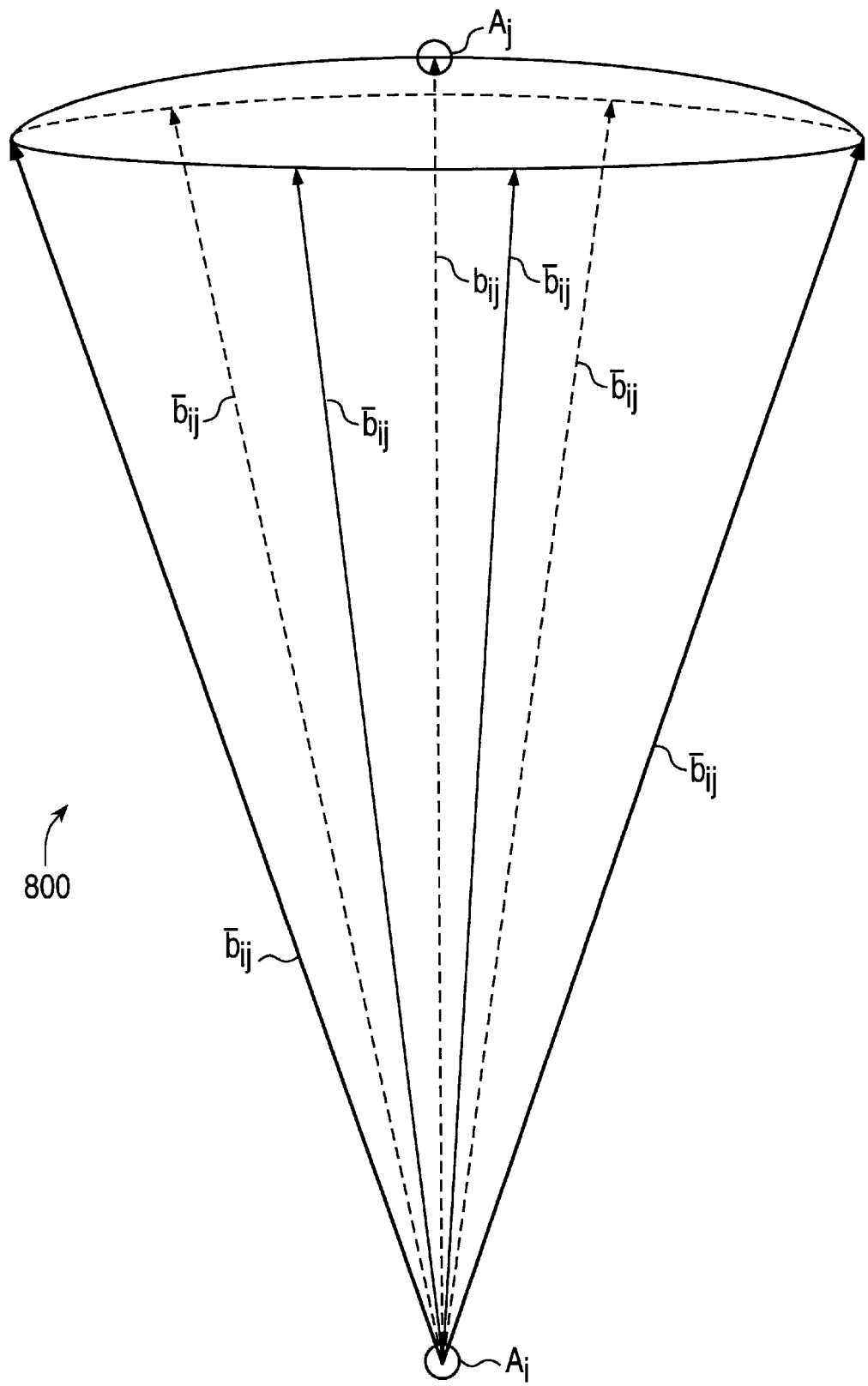
FIG. 8 depicts a plurality of baseline candidate vectors in a limited geometric region in accordance with an illustrative embodiment.

FIG. 8 illustrates a plurality of baseline candidate vectors in a limited geometric region 800 in accordance with the forward integer search procedures previously described in reference to FIG. 6B and FIG. 7B. The plurality of baseline candidate vectors in a limited geometric region 800 further illustrates the nature of the forward integer search procedure. As depicted, a forward integer search is carried out to determine the baseline between a first antenna $A_i$ and a second antenna $A_j$. A correct baseline $b_{ij}$ is depicted. The correct baseline $b_{ij}$ of one of a plurality of candidate baselines $\overline{b}_{ij}$. While the limited geometric region is depicted as having circular cross sections in planes perpendicular to a line joining the first antenna $A_i$ and the second antenna $A_j$, one skilled in the art will recognize this is not fundamental to the current invention. Embodiments of the invention alternatively use regions having rectangular cross-sections.

The forward integer search procedure uses information respecting one or more orientation angles of the baseline being determined. This information may come from previously determined baselines or from other sources. In accordance with the illustrative embodiment, the orientation angle information are coarse estimates of the heading and roll of the correct baseline $b_{ij}$ from one or more previously determined baselines. The limited geometric region is selected responsive to the orientation angle information and the known magnitude of the correct baseline $b_{ij}$.

Shown in the limited geometric region are the plurality of candidate baselines $\overline{b}_{ij}$. The plurality of candidate baselines $\overline{b}_{ij}$ correspond to candidate integer sets of the integer ambiguity associated with the baseline between the first antenna $A_i$ and the second antenna $A_j$. One skilled in the art will recognize that not all candidate integer sets would have corresponding baseline candidates in the limited geometric region. Baseline candidate vectors lying in the limited geometric region are evaluated by the forward integer search procedure. The forward integer search procedure thus selects the correct baseline $b_{ij}$ from among the plurality of candidate baselines $\overline{b}_{ij}$ lying in the limited geometric region.

EXAMPLES

Any single baseline has a pointing direction, including any baseline derived from any combination of two or more antennas. This pointing direction can be used to determine partial orientation of a rigid body, by calculation of two or three degrees of freedom of the rigid body. One example is the determination of heading and roll of a rigid body to which the two or more antennas are mounted. Another example is determination of heading and pitch. The partial determination of orientation is not limited to these examples.

Any non-parallel set of baselines, comprising two or more baselines, derived from three or more antennas can be used to completely determine the orientation of a rigid body to which the antennas are attached. Orientation can be expressed in a number of ways, one of which is by use of orientation angles such as heading, pitch, and roll.

Partial orientation or complete orientation of a rigid body can be used for information purposes and for operations including control and navigation of vehicles, aircraft, watercraft and spacecraft.

In similar fashion, partial or complete orientation information can be used for determination of pointing direction for sighting devices and remote sensing devices. Orientation information can be used for pointing devices intended to launch projectiles, both ballistic and propelled.

Pointing direction and orientation information can be used for identifying the physical shape and location of structures, rigid or non-rigid, to which multiple antennas are attached. This is useful, for example, in determining the shape and location of portions of flexible or rigid surfaces or booms, or that of implements used to carry out physical placement or excavation. This information can be used among other uses, for controlling the shape and position of such flexible or rigid surfaces, booms, or implements.

Orientation and pointing information can also be used to aim devices designed to receive electromagnetic radiation, such as antennas and solar panels.

Orientation and pointing information can be used to determine the surface characteristics of a surface over which an instrument is moving.

While the present invention may be used alone as the basis for an attitude determination system, it may be combined with other known like methods, such as inertial sensors.

Although the present invention has been described in terms of an illustrative embodiment, one skilled in the art will understand that various modifications and alterations may be made without departing from the scope of the invention. Accordingly, the scope of the invention is not to be limited to the particular embodiments discussed herein, but should be defined only by the appended claims and equivalents thereof.

What is claimed is:

1. A method for determining inter-antenna baselines from radio wave phase measurements, said method comprising:

identifying a first antenna and a second antenna located a distance D1 apart;

identifying a third antenna located a distance D2 from the second antenna;

determining a first baseline between the first antenna and the second antenna using a backward integer search procedure; and determining a second baseline between the second antenna and the third antenna using a forward integer search procedure responsive to the first baseline.

2. The method of claim 1, wherein the distance D1 is less than or equal to 2.5 wavelengths of a carrier wave that emanates from a radio source.

3. The method of claim 1, wherein the distance D2 is greater than or equal to 1.0 wavelengths of a carrier wave that emanates from a radio source.

4. The method of claim 1, further comprising the steps:

establishing a fourth antenna; and determining a third baseline between the fourth antenna and one of the first antenna, the second antenna, and the third antenna, the third baseline being determined using a forward integer search procedure responsive to at least one previously-determined baseline.

5. The method of claim 1, wherein the step of determining a first baseline between the first antenna and the second antenna using a backward integer search procedure comprises steps of:

performing a backward integer search procedure for each of a plurality of different radio source carrier frequencies;

identifying at least one baseline candidate at each of the different radio source carrier frequencies;

evaluating each of the baseline candidates with a baseline quality test; and selecting as a first baseline the baseline candidate that satisfies the baseline quality test for each of the plurality of different radio source carrier frequencies.

6. The method of claim 1, wherein the step of determining a second baseline between the second antenna and the third antenna using a forward integer search procedure responsive to the first baseline comprises steps of:

performing a forward integer search procedure for each of a plurality of different radio source carrier frequencies;

identifying at least one baseline candidate at each of the different radio source carrier frequencies;

evaluating each of the baseline candidates with a baseline quality test; and selecting as a first baseline the baseline candidate that satisfies the baseline quality test for each of the plurality of different radio source carrier frequencies.

7. The method of claim 1, wherein the step of determining a first baseline between the first antenna and the second antenna using a backward integer search procedure comprises steps of:

ranking a plurality of baseline candidates on the basis of a ranking criterion;

identifying a highest ranked baseline candidate and a next highest ranked baseline;

computing a difference measure related to the difference between the highest ranked baseline candidate and the next highest ranked baseline candidate; and selecting the highest ranked baseline candidate as the first baseline if the difference measure is above a predetermined threshold.

8. The method of claim 1, wherein the step of determining a second baseline between the second antenna and the third antenna using a forward integer search procedure responsive to the first baseline comprises steps of:

determining a plurality of attitude component estimates from the first baseline;

selecting a limited geometric region responsive to the plurality of attitude component estimates, vectors in the limited geometric region corresponding to candidate integer sets;

determining a second baseline responsive to the candidate integer sets corresponding to vectors in the limited geometric region.

9. A method for selecting a baseline from a plurality of baseline candidates comprising:

ranking the plurality of baseline candidates on the basis of a ranking criterion;

identifying a highest ranked baseline candidate and a next highest ranked baseline;

computing a difference measure related to the difference between the highest ranked baseline candidate and the next highest ranked baseline candidate; and selecting the highest ranked baseline candidate if the difference measure is above a predetermined threshold.

10. The method of claim 9, wherein the difference measure is the difference of the magnitude of the least squares residuals of the baselines associated with the highest ranked candidate integer set and the next highest ranked candidate integer set.

11. A method of determining an inter-antenna baseline from estimates of two or more orientation angles of the baseline, the method comprising:

determining a limited geometric region from estimates of the two or more orientation angles of the baseline;

identifying a plurality of baseline candidate vectors in the limited geometric region from candidate integer sets that resolve an integer ambiguity associated with the inter-antenna baseline;

selecting the inter-antenna baseline from the plurality of baseline candidate vectors.

12. The method of claim 11, wherein the limited geometric region is determined by deviating the estimates of the two or more orientation angles by a predetermined amount.

13. The method of claim 11, wherein the step of selecting the inter-antenna baseline from the plurality of baseline candidate vectors comprises steps of:

ranking the plurality of baseline candidates on the basis of a ranking criterion;

determining a highest ranked candidate and a next highest ranked baseline candidate;

computing a difference measure related to the difference between the highest ranked baseline candidate and the next highest ranked baseline candidate; and rejecting the plurality of baseline candidates if the difference measure is within a predetermined range; and selecting the inter-antenna baseline from the plurality of baseline candidates if difference measure is outside the predetermined range.

14. The method of claim 13, wherein the difference measure is the difference of the magnitude of the least squares residuals of the baseline candidates.

15. The method of claim 11, wherein the step of selecting the inter-antenna baseline from the plurality of baseline candidate vectors comprises steps of:

evaluating the plurality of baseline candidate vectors with a baseline quality test; and selecting the inter-antenna baseline from baseline candidate vectors passing the baseline quality test.

16. The method of claim 15, wherein the baseline quality test is based on the baseline's magnitude.

17. The method of claim 15, wherein the baseline quality test is based on the baseline's least squares residual.

18. The method of claim 15, wherein the baseline quality test is based on a weighted sum of the errors in the baseline's computed magnitude, the magnitude of the baseline's least squares residual, and an error in the computed angle formed with the first baseline, wherein some weights may be zero.

19. An apparatus configured to determine inter-antenna baselines from radio wave phase measurements; the apparatus having a processor, and a memory, the apparatus comprising:

means for determining a first baseline between a first antenna and a second antenna using a backward integer search procedure, wherein the first antenna and the second antenna are located a distance D1 apart; and means for determining a second baseline between the second antenna and a third antenna using a forward integer search procedure responsive to the first baseline, wherein the second antenna and the third antenna are located a distance D2 apart.

20. The apparatus of claim 19, wherein the distance D1 is less than about 2.5 wavelengths of a carrier wave that emanates from a Global Positioning System satellite.

21. The apparatus of claim 19, wherein the distance D2 is greater than about 1.0 wavelengths of a carrier wave that emanates from a pseudolite.

22. The apparatus of claim 19 further comprising:

means for determining a third baseline between a fourth antenna and one of the first antenna, the second antenna, and the third antenna, the third baseline being determined using a forward integer search procedure responsive to at least one previously-determined baseline.

23. The apparatus of claim 19 wherein the means for determining a first baseline between the first antenna and the second antenna using a backward integer search procedure comprises:

means for ranking a plurality of baseline candidates on the basis of a ranking criterion;

means for identifying a highest ranked baseline candidate and a next highest ranked baseline;

means for computing a difference measure related to the difference between the highest ranked baseline candidate and the next highest ranked baseline candidate; and;

means for selecting the highest ranked baseline candidate as the first baseline if the difference measure is above a predetermined threshold.

24. The apparatus of claim 19, wherein the means for determining a second baseline between the second antenna and the third antenna using a forward integer search procedure responsive to the first baseline comprises:

means for determining a plurality of attitude component estimates from the first baseline;

means for selecting a limited geometric region responsive to the plurality of attitude component estimates, vectors in the limited geometric region corresponding to candidate integer sets;

means for determining a second baseline responsive to the candidate integer sets corresponding to vectors in the limited geometric region.

25. The apparatus of claim 23 wherein the difference measure is the difference of the least squares residuals of the baselines associated with the highest ranked candidate integer sets and the next highest ranked candidate integer sets.

26. An apparatus for determining inter-antenna baselines among at least a first antenna, a second antenna, and a third antenna from a plurality of carrier waves, the apparatus comprising:

a microprocessor;

at least one receiver configured to report the carrier wave phases sensed by the antennas;

a storage medium coupled to the microprocessor and storing code which configure the microprocessor to perform steps of:

detecting a sensed phase difference between the phases reported by the first receiver and the second receiver for each of the plural carrier waves;

identifying candidate integer sets constituting an integer ambiguity associated with a first baseline, the first baseline representing the relative position of the first antenna and the second antenna;

determining the first baseline from the sensed phases differences and the candidate integer sets wherein the integer ambiguity is resolved with a backward integer search procedure; and determining a second baseline representing the relative position of the second antenna and the third antenna; using a forward integer search procedure responsive to the first baseline.

27. An apparatus for selecting a baseline from a plurality of baseline candidates, the apparatus comprising:

a microprocessor;

a storage medium coupled to the microprocessor and storing program instructions that configure the microprocessor to perform steps of:

ranking the plurality of baseline candidates on the basis of a ranking criterion;

identifying a highest ranked baseline candidate and a next highest ranked baseline;

computing a difference measure related to the difference between the highest ranked baseline candidate and the next highest ranked baseline candidate; and selecting the highest ranked baseline candidate if the difference measure is above a predetermined threshold.

28. An apparatus for determining an inter-antenna baseline from estimates of two or more orientation angles of the baseline, the apparatus comprising:

a microprocessor;

a storage medium coupled to the microprocessor and storing program instructions that configure the microprocessor to perform steps of:

determining a limited geometric region from estimates of the two or more orientation angles of the baseline;

identifying a plurality of baseline candidate vectors in the limited geometric region from candidate integer sets that resolve an integer ambiguity associated with the inter-antenna baseline;

selecting the inter-antenna baseline from the plurality of baseline candidate vectors.

29. The apparatus of claim 28, wherein the step of selecting the inter-antenna baseline from the plurality of baseline candidate vectors comprises steps of:

ranking the plurality of baseline candidates on the basis of a ranking criterion;

identifying a highest ranked baseline candidate and a next highest ranked baseline;

computing a difference measure related to the difference between the highest ranked baseline candidate and the next highest ranked baseline candidate; and selecting the highest ranked baseline candidate if the difference measure is above a predetermined threshold.

30. The apparatus of claim 29, wherein the step of selecting the inter-antenna baseline from the plurality of baseline candidate vectors comprises steps of:

evaluating the plurality of baseline candidate vectors with a baseline quality test; and selecting the inter-antenna baseline from baseline candidate vectors passing the baseline quality test.

31. The apparatus of claim 30, wherein the baseline quality test is based on the baseline's magnitude.

32. The apparatus of claim 30, wherein the baseline quality test is based on the baseline's least squares residual.

33. The apparatus of claim 30, wherein the baseline quality test is based on a weighted sum of the errors in the baseline's computed magnitude, the magnitude of the baseline's least squares residual, and an error in the computed angle formed with the first baseline, wherein some weights may be zero.

34. An antenna configuration comprising a first antenna a second antenna located a distance D1 from the first antenna, wherein the distance D1 is less than or equal to 1.75 wavelengths of a predetermined carrier wave;

a third antenna located a distance D2 from the second antenna, wherein the distance D2 is greater than or equal to 2.75 wavelengths of the predetermined carrier wave; and a fourth antenna located a distance D3 from said first antenna and a distance D4 from said third antenna, wherein said distance D3 is greater than or equal to 3.0 wavelengths of the predetermined carrier wave and wherein said distance D4 is greater than or equal to 1.0 wavelengths of the predetermined carrier wave.

35. The antenna configuration of claim 34 wherein the predetermined carrier wave is a carrier wave from a Global Positioning System satellite.

36. A GPS attitude system comprising a plurality of antenna-receiver units configured to report phases from GPS carrier waves; and a processing system coupled to the plurality of antenna-receiver units configured to process the phases to compute attitude, the processing system configured to initialize with steps comprising:

identifying a first antenna, a second antenna, and a third antenna associated with the plurality of antenna-receiver units;

determining a first baseline between the first antenna and the second antenna using a backward integer search procedure; and determining a second baseline between the second antenna and the third antenna or between the first antenna and the third antenna using a forward integer search procedure responsive to the first baseline.

37. The antenna configuration of claim 34 wherein said fourth antenna is noncolinear with said first antenna and said third antenna.

* * * * *